United States Patent
Alex

(10) Patent No.: US 10,236,968 B2
(45) Date of Patent: Mar. 19, 2019

(54) HIGH ALTITUDE POINT TO MULTIPOINT LINKS

(71) Applicant: Facebook, Inc., Menlo Park, CA (US)

(72) Inventor: Sam Padinjaremannil Alex, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/680,667

(22) Filed: Aug. 18, 2017

(65) Prior Publication Data

US 2018/0054251 A1 Feb. 22, 2018

Related U.S. Application Data

(60) Provisional application No. 62/376,462, filed on Aug. 18, 2016.

(51) Int. Cl.

| | |
|---|---|
| H04W 16/28 | (2009.01) |
| H04B 7/185 | (2006.01) |
| H04W 52/26 | (2009.01) |
| H04W 72/04 | (2009.01) |
| H04W 52/24 | (2009.01) |
| H04W 52/42 | (2009.01) |
| G01S 19/49 | (2010.01) |
| G01S 19/53 | (2010.01) |

(Continued)

(52) U.S. Cl.
CPC .......... *H04B 7/18506* (2013.01); *G01S 19/49* (2013.01); *G01S 19/53* (2013.01); *G01S 19/54* (2013.01); *H04W 16/28* (2013.01); *H04W 52/243* (2013.01); *H04W 52/262* (2013.01); *H04W 52/42* (2013.01); *H04W 72/0446* (2013.01); *G01C 21/16* (2013.01); *G01S 19/42* (2013.01); *H04W 36/16* (2013.01); *H04W 64/00* (2013.01); *H04W 84/005* (2013.01); *H04W 88/005* (2013.01); *H04W 88/08* (2013.01)

(58) Field of Classification Search
CPC .............................. H04W 16/28; H04B 7/0617
USPC ........ 455/509, 3.02, 430, 452.1, 456.1, 463, 455/63.4, 67.11
See application file for complete search history.

(56) References Cited

U.S. PATENT DOCUMENTS

| | | | | |
|---|---|---|---|---|
| 2004/0173684 A1* | 9/2004 | Wilz, Sr. | ................ | B82Y 15/00 235/462.45 |
| 2016/0380353 A1* | 12/2016 | Lysejko | .............. | H04L 41/0806 343/872 |
| 2018/0054252 A1* | 2/2018 | Gan | ................... | H04B 7/18578 |

OTHER PUBLICATIONS

W. H. Theunissen, and W. D. Burnside, "Contour beam reflector antenna for wireless applications", IEEE Transactions on Antennas and Propagation, vol. 50, No. 2, Feb. 2002, pp. 205-210.

* cited by examiner

*Primary Examiner* — John J Lee
(74) *Attorney, Agent, or Firm* — FisherBroyles, LLP

(57) ABSTRACT

Systems and methods for communicating in a point to multipoint (PTMP) network that includes an aerial station and a plurality of ground stations. The method includes the aerial station receiving positional information of a ground station of the plurality of ground stations, selecting antenna elements on a phased antenna array for generating a directional beam based on the positional information, sweeping the directional beam to cover the plurality of ground stations, determining that the directional beam has a beam width sufficient to cover the plurality of ground stations and a transmit power sufficient to provide signals to the ground stations based on the sweeping of the directional (Continued)

beam; and establishing a radio link between the aerial station and the ground station in the plurality of ground stations.

20 Claims, 15 Drawing Sheets

(51) Int. Cl.
*G01S 19/54* (2010.01)
*H04W 88/08* (2009.01)
*H04W 88/00* (2009.01)
*G01S 19/42* (2010.01)
*G01C 21/16* (2006.01)
*H04W 64/00* (2009.01)
*H04W 84/00* (2009.01)
*H04W 36/16* (2009.01)

HIGH ALTITUDE POINT TO MULTIPOINT LINKS

CROSS-REFERENCE TO RELATED APPLICATION(S)

This application claims the benefit of U.S. Provisional Patent Application No. 62/376,462, filed on Aug. 18, 2016, and titled "HAPiLink PTMP System Design", which is incorporated herein by reference in its entirety.

TECHNICAL FIELD

The present technology is generally related to the field of transmitting/receiving wireless signals, e.g., between unmanned aerial vehicles (UAVs) and ground stations.

BACKGROUND

Wireless communication systems transfer signals from a transmitter (TX) of one station to a receiver (RX) of another station. In applications such as airborne wireless communication systems, one of the stations can be ground-based (i.e., stationary) while the other station can be carried by an aerial station (e.g., a flying object such as a satellite in Earth's orbit or an airplane). The ground station, for example, can be electronic user equipment that directly or indirectly (e.g., via an intermediary router or a switch) communicates with the flying object.

In wireless airborne systems, an aerial station can communicate with ground stations using different logical configurations. In one type of logical configuration, an aerial station can communicate with a single ground station via a dedicated point to point (PTP) link. In a PTP link, there is a single aerial station and a single ground station communicating at a given time. In a PTP link, the capacity of the transmission channel is dedicated for a single connection between a ground station and an aerial station.

In another type of logical configuration, an aerial station can communicate with multiple ground stations via a shared point to multi point (PTMP) link. In a PTMP link, the capacity of the transmission channel is shared among the ground stations connected to the link. Thus, for applications in which a limited number of aerial stations are providing connectivity to a large number of ground stations, a PTMP facilitates better resource utilization than a PTP link. In a PTMP network, a ground station determines whether it is the intended recipient of the packet based on the address field in the packet. If the ground station determines that it is the intended recipient, a ground station keeps the packet for further processing. Otherwise, the ground station discards the packet. A PTMP link typically is easier to install, has lower cost to maintain, and provides greater reliability than a PTP link.

DETAILED DESCRIPTION

Figure 1:
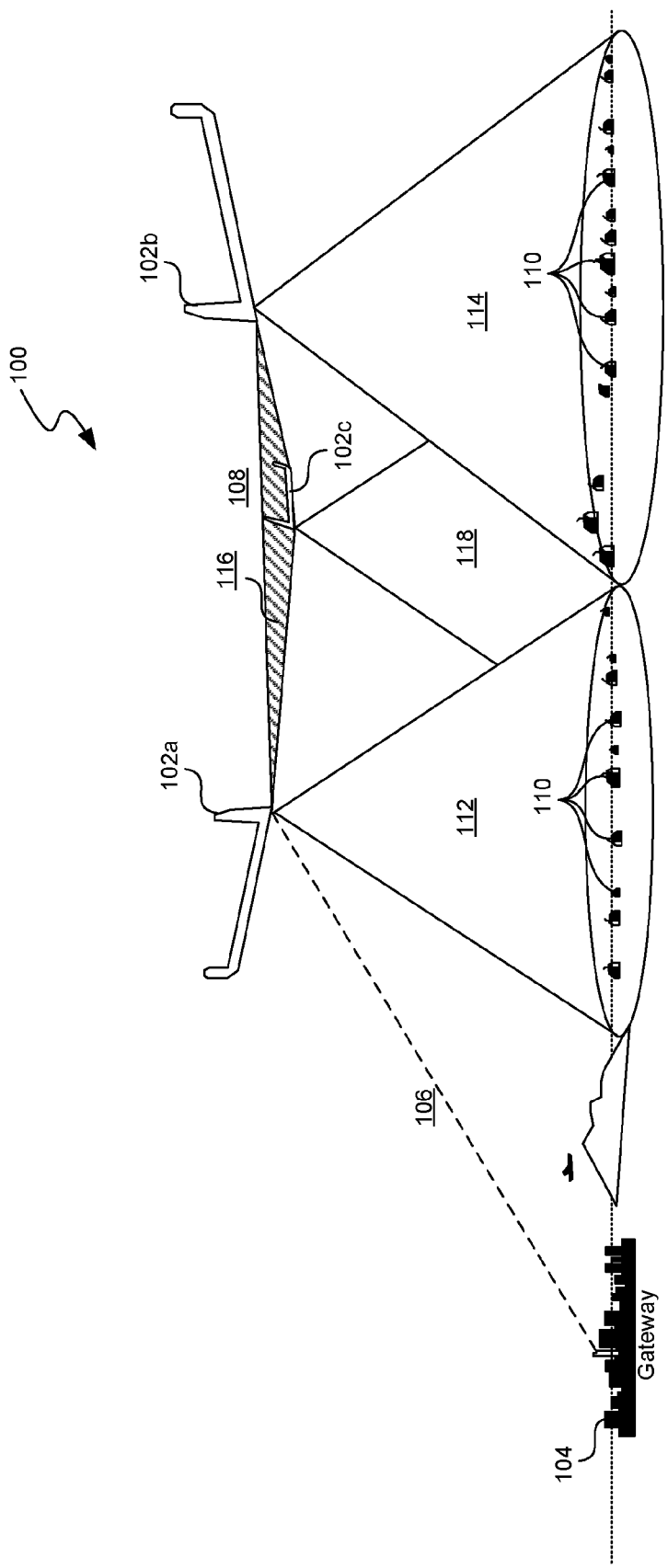
FIG. 1 shows an illustrative example environment of operation of technology point to multi point (PTMP) link.

The following disclosure describes various embodiments of systems and associated methods for transmitting wireless signals between aerial vehicles and ground stations. In some implementations, a high-altitude platform Internet link (HAPiLink) using a High Altitude Platform (HAP) such as an unmanned aerial vehicle (UAV) communicating data to multiple ground stations is capable of achieving low cost/ high bandwidth wireless communications. Further, a UAV can be programmed/auto-piloted to fly at 60,000 to 90,000 feet. Flying at such high altitudes enables the UAV to be powered by solar radiation, thereby enabling the UAV to stay in operation until failure.

Many areas of the world lack Internet connectivity because of lack of infrastructure, difficult geographical terrain, and inclement weather conditions. Conventional approaches to provide Internet connectivity, e.g., using fiber-optic cable, satellite, microwave repeaters and 3G/4 G cell towers, may be a challenge to deploy cost-effectively in these regions. The disclosed embodiments can be used, for example, to provide Internet connectivity in such underserved areas.

In some implementations, an aerial station (such as a UAV) and/or a ground station can be equipped with multiple antennas that can be divided into multiple antenna arrays, each capable of communicating with one or more ground stations. The antenna arrays may be reconfigured to dedicate a larger or a smaller number of individual antenna elements included in a particular antenna array. The individual antenna elements included in an antenna array at an aerial station can be used together to generate directional beams that increase the transmit energy and receive sensitivity of an antenna array in a specific direction, thereby concentrating the power to an intended ground station. As a result, signals from an antenna array directed at particular angles to a ground station experience constructive interference whereas the same signal at other ground stations experience destructive interference.

To provide greater throughputs, an aerial station can include multiple access points (APs) that service different sectors of a geographical area. In conventional techniques, the timing of the multiple APs located on an aerial station are not synchronized. This leads to cross-detection and hence loss in throughput of signals. According to disclosed embodiments, the access points on an aerial station are synchronized in time. For example, a cable that runs a clock signal can be used to interconnect the multiple APs on an aerial station. This can result in a synchronization of the timing of the APs of the aerial station, allowing for the packets transmitted by the APs to be received by the ground stations at generally the same or similar time. This further allows for the ground stations to "lock," or latch, onto the packet corresponding to a stronger signal strength, which would be the proper packet for the ground station to process. As a result, throughput is increased because the ground stations would not lose time to latch onto an incorrect packet, determine that it is an incorrect packet, discard that incorrect packet, and then latch onto the proper packet.

Turning now to the figures, FIG. 1 shows an illustrative example environment 100 of operation of the disclosed technology. Aerial Stations 102A, 102B, and 102C communicate with each other via optical (e.g., laser) links 108. By using narrow beam signals, aerial station 102A can provide network connectivity to multiple ground stations 110 in its coverage area 112. Similarly, aerial stations 102B and 102C can cover multiple ground stations 110 in their respective coverage areas 114 and 118. In some implementations, aerial stations 102A, 102B, and 102C can establish radiofrequency (RF) links (e.g., a PTMP RF link) with the ground stations 110. For example, ground stations 110 can support a 1 Gbps Ethernet interface which can connect to a LTE eNodeB or a WiFi access point. The RF links can help in providing communication signals (e.g., Internet connectivity) to various user devices. Examples of user devices for use with the technology include, but are not limited to, personal computers, server computers, handheld or laptop devices, cellular telephones, wearable electronics, tablet devices, routers, switches, modems, multiprocessor systems, microprocessor-based systems, set-top boxes, home automation devices, programmable consumer electronics, network PCs, minicomputers, mainframe computers, distributed computing environments that include any of the above systems or devices, and the like. The signal (e.g., RF signal) received from an aerial station can be used by devices such as routers, switches, and modems to create a local area network (LAN), a wireless LAN, a cellular network, a wide area network, or any other wired or wireless network. In some implementations, the Internet connectivity between aerial stations 102A, 102B, and 102C and ground stations 110 is based on the Internet Protocol version 6 (IPv6) standard.

In some implementations, a PTMP RF link can provide a total of 10 Gigabits per second (Gbps), for example, using portions of the Ka-band spectrum and in frequency division duplex mode throughput from an aerial station that can be among approximately 100 ground stations. In some implementations, around 2 gigahertz (GHz) of spectrum can be used for downlink (e.g., communications transmitted from an aerial station to a ground station) and 300 MHz of spectrum can be used for uplink (e.g., communications transmitted from a ground station to an aerial station). In some implementations, multiple access for the ground stations 110 can be based on time division multiple access (TDMA). In some other implementations, other multiple access methodologies (e.g., frequency division multiple access or code division multiple access) can be used combined with reuse of spectrum and polarization. Polarization, for example, can be circular (e.g., either Right Hand Circular Polarization or Left Hand Circular Polarization) so that the cross-polarization isolation is invariant to aerial station rotation and/or ground station orientation.

In some implementations, signals do not travel from one ground station to another. In some other implementations, ground stations can communicate with one another. In some implementations, two aerial stations communicate with each other via optical link 108. The mesh 116 of optical cross-links 108 formed as a result of two or more aerial stations is referred to as the Transport network (TN). Also shown in FIG. 1 are a plurality of ground stations 110 on the ground. Aerial station 102A connects to gateway 104 located on the ground via one or more point-to-point RF links 106. In some implementations, gateway 104 can have access to an optical fiber network via an interface point called a point of presence (PoP). The topology in FIG. 1 represents a single hop mesh topology because the ground stations 110 can be reached in a single hop from any of aerial station 102A, 102B, or 102Cs. In some implementations, the aerial stations can be powered by lithium ion batteries or by solar power.

Aerial station 102A, 102B, and 102C are each equipped with one or more modems for establishing their PTMP links with one or more ground stations 110. In some implementations, the modem supporting the PTMP links can be based on the Institute of Electrical and Electronics Engineers (IEEE) 802.11 standards such as the 802.11ad standard. The modem can be customized, for example, at the firmware/driver level to meet the desired specifications of a PTMP link-based system. In some implementations, the same type or customized modem can be used for both an aerial station and a ground station. The firmware loaded into the modem would determine if it functions as a receiver/transmitter or if it functions as an aerial station/ground station. An IEEE 802.11ad-based modem can achieve throughputs of up to 3.5 Gbps. Thus, to exceed a total 10 Gbps target, an aerial station can include four modems, along with a suitable number of RF blocks and antennas.

In some implementations, power transmitted from a ground station is concentrated to a geographical area. Such scenarios may arise, for example, during severe weather conditions such as in high rain/cloud fade scenarios. In such scenarios, phased array antennas (PAAs) along with a Time Division Multiple Access (TDMA) beamforming system can be used to achieve a narrow beam width and the switching speed necessary to support the PTMP link. One advantage of PAA is that it typically generates beams with narrow beam width and minimum side lobe levels. It will be understood that FIG. 1 is for illustration purposes only. In some implementations, there can be any number of aerial stations and/or any number of ground stations of several PTMP links thereby forming a PTMP network.

Figure 2:
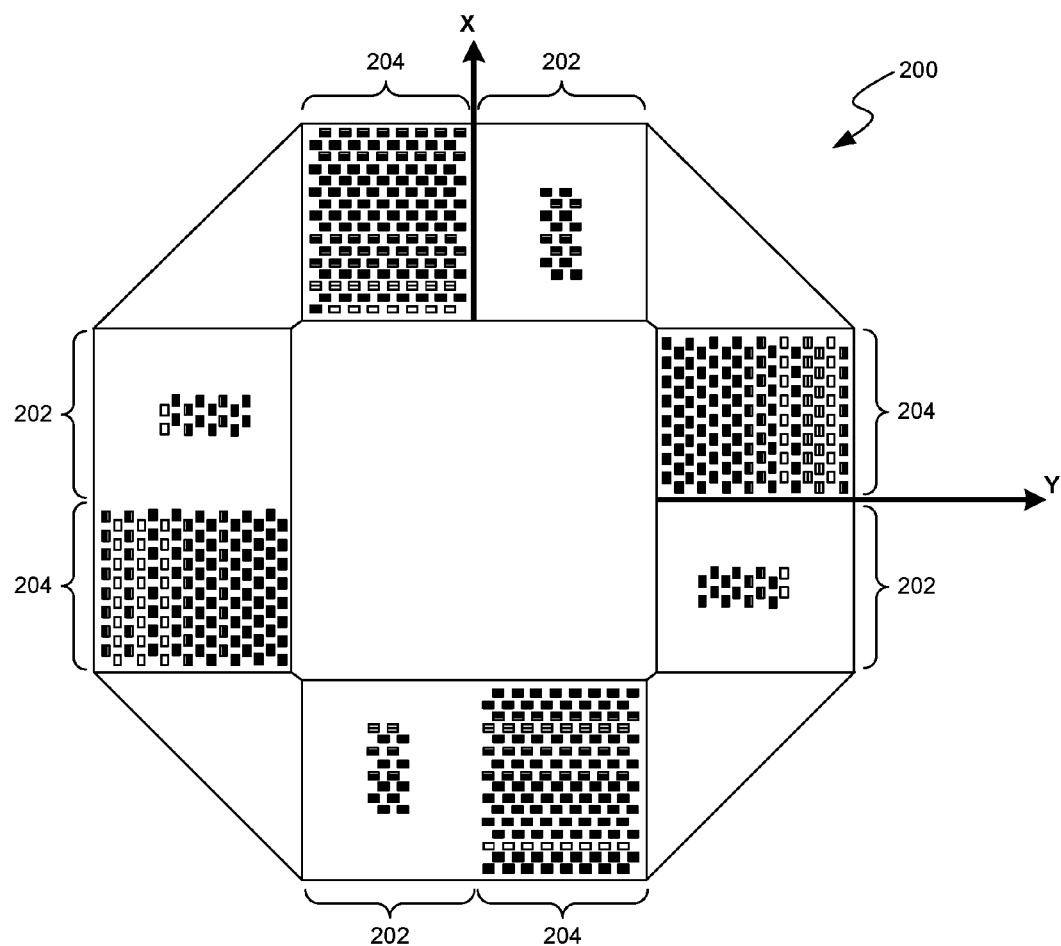
FIG. 2 shows an illustrative view of an antenna array from the ground.

FIG. 2 shows a schematic illustration of a phased antenna array (PAA) pod 200. A phased antenna array can improve the spatial targeting/pointing of a beam between an aerial station and one or more ground stations. The pod of the antenna array can be attached to the airframe of an aerial station. An antenna array can include multiple panels. In FIG. 2, the panels in areas 202 are transmitters (TX) and the panels in areas 204 are receivers (RX).

Depending on the direction of the wireless data transfer for a particular phased antenna array, a phased antenna array can be coupled to power amplifiers (PAs) for downlink or low noise amplifiers (LNAs) for uplink data transfer or communications. In some implementations, a phased antenna array can include multiple individual antennas. The number of the individual antennas in a phased antenna array can depend on the bandwidth associated with a RF link between the aerial station and the ground station(s).

In an antenna array, the direction of the peak sensitivity can be altered without mechanically re-positioning the individual antennas. For example, in a phased antenna array with electronically variable phase shifters, the beam position can be switched by programming the variable phase shifters. In some embodiments, the beam position is switched as fast as the phase shifts are switched.

Figure 3:
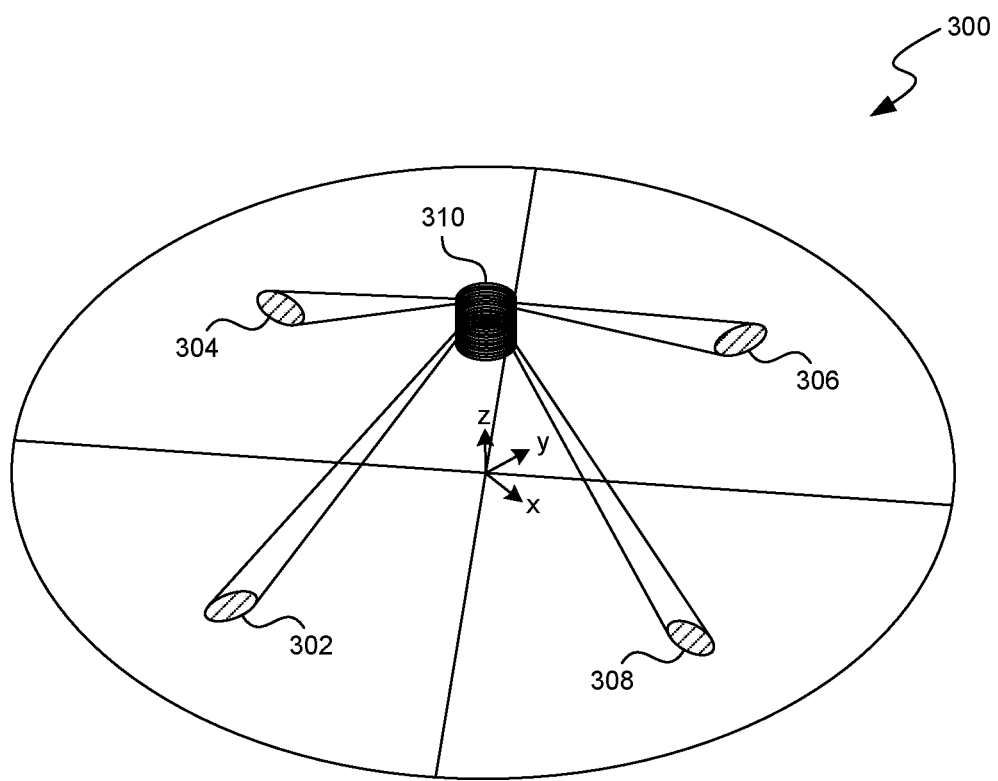
FIG. 3 shows an example of a beam used in conjunction with a phased antenna array.

FIG. 3 shows an example 300 of a beam used in conjunction with a phased antenna array. A PAA pod can service multiple sectors on the ground, e.g., in FIG. 3, each panel of a PAA pod 310 can service each of sectors 302, 304, 306, and 308 on the ground. In some scenarios, the area of the ground covered by the sectors changes as the aerial station moves. For example, the sector (e.g., serving one or more ground stations) can cyclically change as the aerial station hovers around in a circular pattern. A ground station can use parabolic reflector antennas and switch directions to maintain communication with the aerial station. Reflector antennas are typically slow to move, but provide continuity in signal transmissions, e.g., a slight shift of the beam doesn't cause a drop in signal quality.

In some implementations, the same or similar center frequency for the RF-PTMP link can be used in different sectors. Further, in some implementations, opposite sectors can use the same polarization while adjacent sectors can use different polarization in order to achieve sufficient isolation among the sectors. In some example implementations, some constraints can be imposed on the scheduler to reduce interference between opposite sectors.

Figure 4:
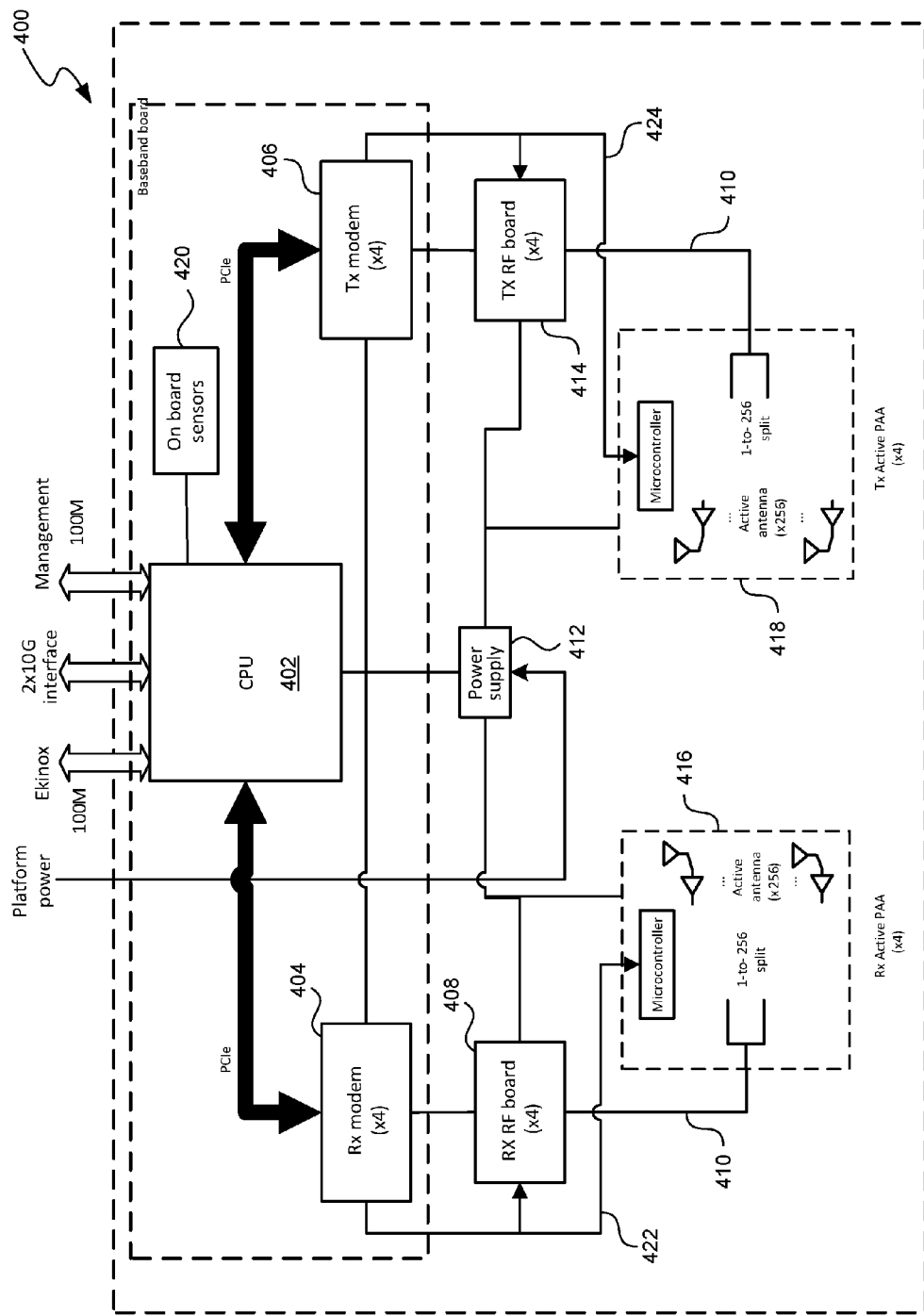
FIG. 4 shows a block diagram of example components included in an aerial station.

FIG. 4 shows a block diagram 400 of example components included in an aerial station. For example, an aerial station includes a CPU 402 connected bi-directionally (via PCI Expresses buses) to a Rx modem 404, a Tx modem 406, and on-board sensors 420 (via I2C/UART bus). CPU 402 acts as controller of the peripheral(s) and the modem(s) it is connected to. Rx modem 404 is connected to Tx modem 406. CPU 402 is connected bi-directionally with an ekinox interface, two 10 G interfaces, and a management interface. In some implementations, the Global Navigational Satellite System (GNSS) and/or an inertial navigation system (INS) provides navigational/positional data to CPU 402. The ekinox interface is typically a 10/100 Mbps Ethernet link to obtain GNSS/INS information for the PTMP system. The GNSS/INS information can be used to calculate attitude information of the aerial station. For example, the aerial station attitude can refer to an orientation of the aerial station in space with respect to some reference such as the horizon of the earth, for example, the value of three angles: heading or yaw (around the yaw axis), pitch (around the lateral axis), and roll or bank (around the longitudinal axis). In some implementations, the attitude information of the aerial station is used by the beamformer to generate or adjust the beams to communicate with the ground stations. In some implementations, the beams from the beamformer are narrow (around 6° and 3 decibel (dB) beam width) and incorrect attitude information can cause the beams' main lobe to miss its target (e.g., one or more ground stations on the ground), resulting in a poor quality (e.g., lower throughput) communications link between the aerial station and the ground station. In addition, the GNSS also provides a GNSS time pulse (pps) to Tx modem 406, Rx modem 404, and CPU 402. The GNSS can also provide reference clock to the Phase Locked Loop (PLL), which is a peripheral device. In some implementations. the PLL generates the clocks necessary for the baseband and RF. For example, the PLL can generate clocks for the Tx modem 406 and the RX modem 404. In some implementations, the PLL also generates a 10 MHz test tone. In some implementations, the generated tones would have zero ppb with respect to the source clock (e.g., referenced from GNSS or an external 10 MHz clock). The peripheral devices can include a PLL, an accelerometer, a gyro, and a magnetometer.

The Management interface in FIG. 4 is a TT&C (Telemetry, Tracking, and Command) bidirectional RF link that is used for exchange of control information between an aerial station and a ground station controller. For example, this link can be used to provide commands to the aerial station and to monitor the health and status of the aerial station. In some implementations, a small data payload is provisioned along with the avionics payload in order to control and monitor the communication system.

The data on the communication payload can be configured to what is apt for the application. For the initial phase it would contain information like aerial station heading, location, etc. so that the ground station on the ground can point its beams towards and track the aerial station.

On-board sensors 420 include sensors for attitude measurement and temperature measurement. The accelerometer, gyro, and/or magnetometer can also be used for attitude measurement. In some implementations, a differential GNSS module or a real time kinetic (RTK) module can be used to compute the heading (e.g., compass direction such as north, south, east, west, etc.) of the aerial station.

The 10 G interface in FIG. 4 is a bidirectional link to the CPU 402. For example, this link can be a 850 nanometer (nm) optical link. The data traffic ingresses into the PTMP system through this link on the forward path. Likewise, the return traffic egresses the PTMP system through this link. In some implementations, the forward to return utilization on this link can be 8:1.

In some implementations, the CPU 402 can act as a traffic switch for switching traffic between various network interfaces (e.g., 10G, 1G and modems). The CPU 402 can also provide functionalities such as Frame conversion frame aggregation/deaggregation, packet switching, handovers, Quality of Service (QoS) classification, flow control, inter-sector scheduling, overall network management, beamformer computation, conversion of orientation to look vectors, etc. In some implementations, the "look vector" can be translated into beamformer coefficients used to provide the beams. Rx modem 404 is connected to Rx RF board 408 via a I/Q interface and the Rx RF board is connected to a 1-to-256 split in Rx active PAA 416. Rx modem 404 is connected to a microcontroller in Rx active PAA 416 via control bus 422. Rx active PAA 416 includes a microcontroller, one or more active antennas, and a 1-to-256 split. Tx active PAA 418 includes a microcontroller, one or more active antennas, and a 1-to-256 split. The Rx RF board 408 is connected via RF cable 410 to a Rx active PAA 416. Tx modem 404 is connected with Tx RF board 414 via an I/Q interface. Tx modem 406 is connected to a microcontroller in Tx active PAA 418 via control bus 422. Tx modem 406 is connected to Tx RF board 414 which is connected to a 1-to-256 split included in Tx active PAA 418. The Tx RF board 414 is connected to the Tx active PAA 418 via RF cable 410. Power supply 412 provides DC power to Rx active PAA 416, Tx active PAA 418, Rx RF board 408, Tx RF board 414, and CPU 402 via power cables. Power supply 412 receives power externally from a platform power source. Tx modem 406 and the Rx modem 404 can be based, for example, on the IEEE 802.11ad standard, or a modified version of the 802.11ad.

Tx modem 406 and Rx modem 404 implement several functions associated with the RF link. Examples of such functions are intra-sector scheduling, Quality of Service (QoS) classification, link adaptation, power control, timing control, initial access, Physical (PHY) layer functions, RF and PAA control/configurations. In some implementations, the coverage region on the ground is divided into four sectors. Thus, for example, an aerial station can communicate with ground stations located in each of the four sectors. In some implementations, an aerial station communicates with ground stations located in a single sector.

In some implementations, cables used in the electrical/mechanical/optical connections are differential cables and are shielded to avoid interference from/to other components and modules. In some implementations, sub-assemblies (e.g., PAA/RF/Modem/CPU) are housed in separate metal structures to reduce interference among them.

In some implementations, the hardware architecture is modular. The modular architecture allows for a common design and boards for the aerial stations and the ground stations. For example, the design and boards for the aerial stations and the ground stations can be similar (or identical) from a baseband perspective but can be configured to run different software. For example, the modem board can support both transmitter and/or receiver operations.

In FIG. 4, components denoted as "x4" indicate that there are four sets of components to account for multiple sectors, e.g., four sectors. It will be understood that the components, their functionalities, and the arrangement shown in FIG. 4 are for illustrative purposes. In other implementations, there can be different complements included in an aerial station and/or with same or different arrangements.

Figure 5:
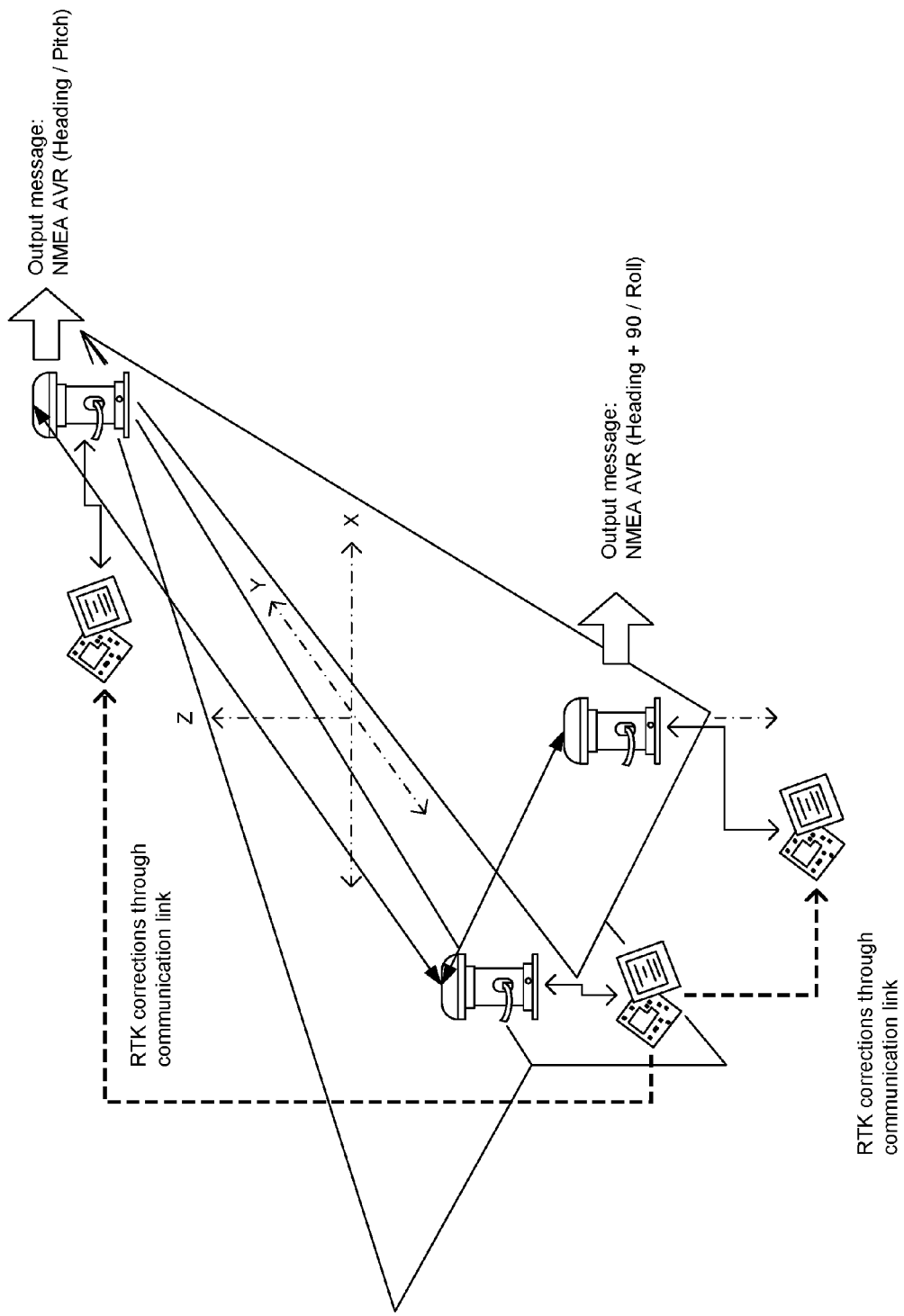
FIG. 5 shows an example three-antenna setup for determination of three principal axes at an aerial station.

FIG. 5 shows an example three antenna setup for determination of three principal axes at an aerial station. For example, the antennae can be placed at the nose and two wing tips of an aerial station. For example, this setup can be used to point a beam from an aerial station's antenna directed towards the ground stations on the ground. In some embodiments, real time kinematics (RTK) corrections can be used to achieve centimeter level accuracy in estimation of location. A base (fixed) antenna and a rover (moving) antenna are utilized. The base antenna communicates one or more location-related parameters (e.g., estimated phase of the signal and position of the fixed antenna) to the rover antenna. Upon receiving the one or more location-related parameters from the base antenna, the rover antenna computes the relative values of the one or more location-related parameters, with reference to the base antenna.

In some implementations, the disclosed system is adaptable to have both base and rover antennae on the moving platform. The system can get the relative position (rover antenna to base antenna) to be within a maximum error of 1 centimeter (cm). This is helpful in computing the heading accurately. The farther apart the rover and the base antennae are placed, the better is the heading accuracy. A third antennae (e.g., as shown in FIG. 5) can be placed in order to obtain the three-dimensional heading from communication messages which are output by the antennae. For example, the messages can be in National Marine Electronics Association (NMEA) AVR protocol format. In some implementations, a three-dimensional heading is employed as any error in orientation in three dimensions could result in the beam pointing in the wrong direction.

Figure 6:
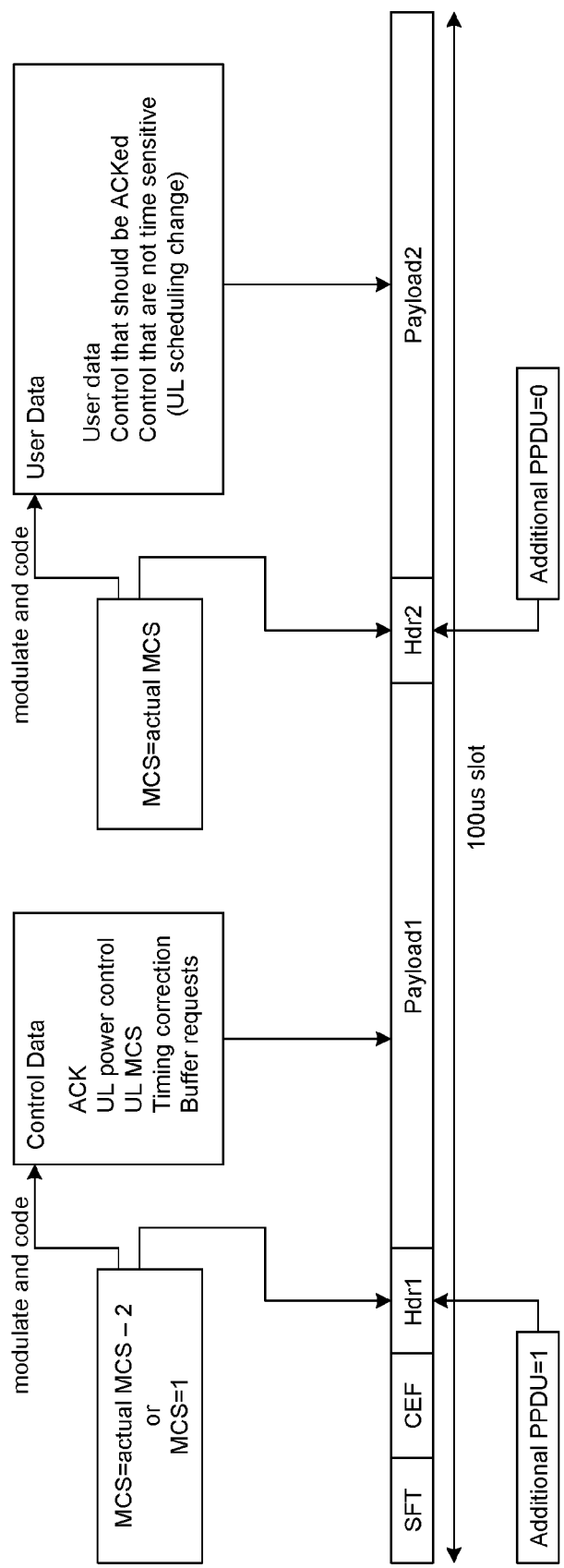
FIG. 6 shows a schematic of an example packet from an aerial station to a ground station.

FIG. 6 shows a schematic of an example packet transmitted from an aerial station to a ground station. For example, the packet can be transmitted in a time slot of 100 microseconds. In some implementations, time is split into equal-sized (or similar-sized) slots in both uplink (ground station to aerial station) and downlink (aerial station to ground station) directions. These slots can be synced at the aerial station for both uplink and downlink directions. In some implementations, the slots can be synced across sectors. For a normal data transmission a single 802.11ad packet can be transmitted within one slot. For a beacon transmission and random access channel (RACH) transmission, multiple packets can be transmitted in a single slot. As shown in FIG. 6, the additional PPDU bit is set in the first header (Hdr1) and the additional PPDU bit is not set in the second header (Hdr2) of the packet. FIG. 6 also shows examples of the information included in the first payload (Payload 1) and second payload (Payload 2) of the packet.

In some implementations, time is split into equal-sized (or similarly-sized) slots in both uplink (ground station to aerial station) and downlink (aerial station to ground station) directions. These slots can be synced at the aerial station for both uplink and downlink directions. In some implementations, the slots can be synced across sectors.

Figure 7:
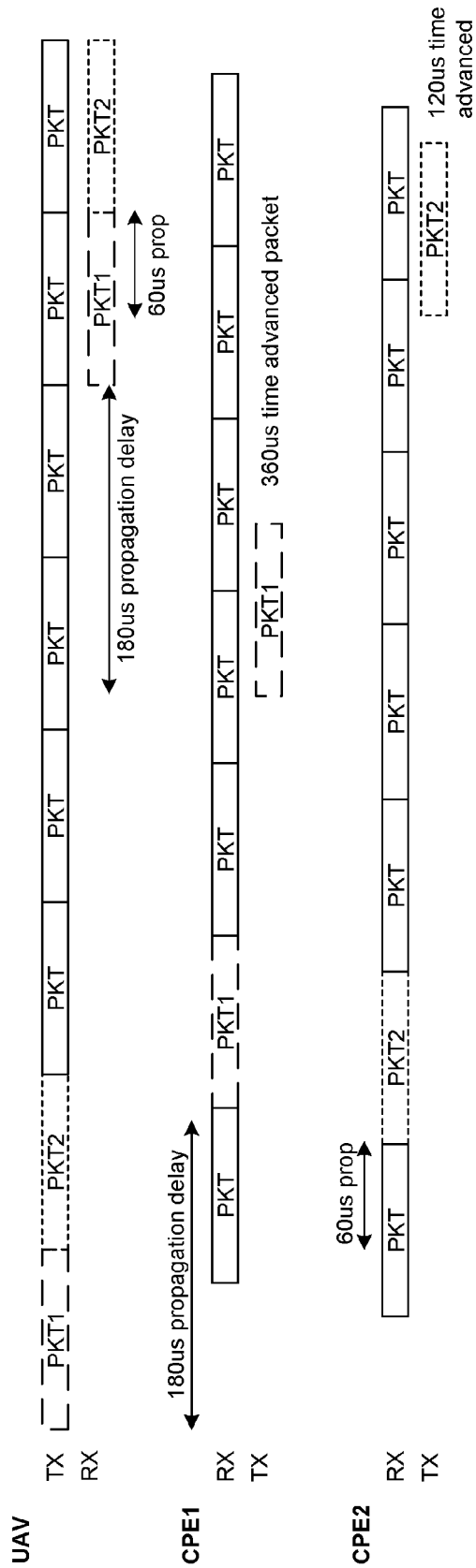
FIG. 7 shows an example timing diagram in connection with an aerial station and 2 ground stations.

FIG. 7 shows an example timing diagram in connection with an aerial station and 2 ground stations. For example, transmitter and receiver timing diagrams in connection with an aerial station (e.g., labeled as UAV in FIG. 7) and two ground stations (e.g., labeled as CPE1 and CPE2 in FIG. 7). Time is split into equal- or similarly-sized slots. For example, time slots can be 100 microseconds to 400 microseconds long in time duration in both downlink and uplink directions. In some implementations, time slots can be synced at the aerial station for communications among sectors and between uplink and downlink.

In some implementations, timing is with reference to an aerial station clock, i.e. both Tx and Rx slots at an aerial station is aligned with the aerial station clock. The ground stations would receive transmission from the aerial station with a time offset depending on the time of flight. The ground station would transmit back to the aerial station in a manner such that the signal received at the aerial station falls precisely within the RX slot at the aerial station. The timing measurement and timing advance on the uplink can be used for this alignment.

In some implementations, multiple access for the disclosed PTMP system can be based on the IEEE 802.11 ad standard with Time Division Multiple Access (TDMA). For a normal data transmission an 802.11ad packet can be transmitted within one slot. For a beacon transmission and RACH transmission, multiple packets can be transmitted in a single slot. Thus, each slot can be divided into sub slots during which a packet is transmitted. A beacon transmission, for example, can be sent when a ground station newly joins a PTMP network. Upon receiving a beacon transmission, the ground station derives the timing reference (e.g., slot boundary). In some implementations, a ground station also derives other information related to an opportunity for a RACH transmission. During a RACH transmission, multiple ground stations use a shared channel for setting up a data transmission to an aerial station. Information related to an opportunity for a RACH transmission can be a maximum power that can be transmitted on the RACH.

In some implementations, each slot in the timing diagram can accommodate one or more packets and support analog beamforming in a single direction. In some implementations, the packets are based on SC-PHY (single carrier transmission) with BPSK, QPSK and 16QAM, or 64QAM constellations for modulation. Channel coding can be based, for example, on LDPC (coded block length 672) and the code rates supported can be $\frac{1}{2}$, $\frac{5}{8}$, $\frac{3}{4}$, $\frac{13}{16}$.

Some implementations of the aerial station Tx and Rx modems can use the illustrative values and parameters disclosed herein. The modem can support frequency division duplex (FDD) on a single chip with 100% duty cycle for both Tx as well as Rx. The modem's operating bandwidth at the Tx and Rx can be independently scalable. An advantage of the single chip implementation is that this allows closing the ARQ loop without any burden to the PCIe interface. A PCIe data throughput capacity typically can supports the modem's maximum data rate. The modem can have a flexible RF interface with programmable AGC gains and delays. The modem can also provide corrections for radio imperfections, TX/RX I/Q imbalance correction, TX/RX equalizer, DC offset correction etc. The modem can provide support for PPDU aggregation and comply with 802.11ad SNR-PER performance levels. The modem can also provide support for DPD (digital pre distortion). The modem can use configurable Golay codes/Frequency offsets to avoid cross detection for obtaining accurate SINR and timing estimates.

In some implementations, the PTMP communications are based on constellations up to 16QAM with a ¾ coding rate, the associated EVM is around −25 dB (e.g., 10 dB away from target SNR, in thermal-only scenario, to meet the highest MCS). The increase in target SNR marginally increases if overall EVM is better than −25 dB. Sample values can be I/Q Image rejection=30 dB, XPD <−20 dB, DAC/ADC SQNR=>30 dB (ENoB ~6), Signal to co-channel interference ratio >25 dB, equalizer cap (Gain flatness, GD flatness)=30 dB.

The example table below show the packet size (and overhead) for both downlink and uplink for the lowest MCS (MCS0) for various packet sizes.

additional sensitivity is provided by MCS0. Because it may not be possible to generate a beam broad enough to cover the entire foot print of the sector, rastering can be used to cover the entire footprint of the sector. That is, a beam can scan the footprint of the sector (e.g. using a raster scan technique) in a sweeping format. Having a wide beam can reduce the number of individual raster points. As an illustrative example, a PAA can include 256 elements. Hypothetically, 135 elements can be turned off so that the number of elements in the PAA is reduced to 81. The 3 dB bandwidth for a PAA with 256 elements is 6 degrees and the 3 dB bandwidth for a PAA with 81 elements is 11 degrees. Thus, selective turning off 135 elements results in doubling the 3 dB beam width. In some implementations, approximately 64 beams are used to cover the footprint under one sector.

In some implementations, all sectors simultaneously transmit the beacon. Assuming each beam in a beacon transmission takes 3 microseconds and there are 64 beams, the system will take 200 microseconds to cover the entire footprint under one sector. The beacon transmission can repeat every 50 ms. In some implementations (e.g., broadcast transmissions), the beam can be widened to reduce the raster. Examples of a few ways of widening a beam are:

1. Turn off elements (i.e., smaller antenna aperture): This scheme widens the beam at the expense of antenna gain. That is, turning off the antenna elements achieves a wider beam but can lead to a reduction in total transmitted power.

2. Modify coefficients: According to this scheme, the beam is wider at the expense of gain, but without any reduction in total transmitted power.

3. Form multibeams: By superposition of the coefficients for two or more beam states, a multibeam transmission is generated.

| Downlink | | | | Uplink | | |
|---|---|---|---|---|---|---|
| | Fs | 1.76 | Gsps | | Fs | 0.22 Gsps |
| | Tc | 0.57 | ns | | Tc | 4.55 ns |
| | IFS | 1.00 | us | | IFS | 1.00 us |
| Data Packet | STF SCPHY | 1.24 | us | Data Packet | STF SCPHY | 9.89 us |
| | CEF | 0.65 | us | | CEF | 5.24 us |
| | SCPHY header | 64 | bits | | SCPHY header | 64 bits |
| | header time | 0.04 | us | | header time | 0.29 us |
| | GI | 0.04 | us | | GI | 0.29 us |
| | Packet length | 100.00 | us | | Packet length | 200.00 us |
| | Datapart | 98.07 | us | | Datapart | 184.58 us |
| | Block time | 0.29 | us | | Block time | 2.33 us |
| | #blocks | 337 | | | #blocks | 79 |
| | GI time | 12.26 | us | | GI time | 23.07 us |
| | Actual datapart | 85.81 | us | | Actual datapart | 161.51 us |
| | PHY Overhead | 15.04% | | | PHY Overhead | 19.65% |
| | Spectral efficiency | 0.25 | bps/Hz | | Spectral efficiency | 0.25 bps/Hz |
| | Max PHY Thruput | 0.37 | Gbps | | Max PHY Thruput | 0.04 Gbps |
| | Data transferred | 4.72 | kB | | Data transferred | 1.11 kB |

In some implementations, the aerial station implements analog geometric beamforming by co-phasing antenna elements to coherently transmit/receive to/from a geometrical direction. For example, the aerial station can use a combination of spatial pointing and iterative training for accurate alignment of the beam. The PAA at the aerial station may be calibrated optionally.

When transmitting broadcast information, in order to "close the link" at the ground station, the disclosed system can increase the beam width by selectively turning off the antenna elements at the edge of the phase array. Turning off the antenna elements in the PAA can lead to a reduced sensitivity of the PAA. The lowered sensitivity can be compensated by operating at the lowest modulation and coding scheme (MCS), also denoted as MCS0. The number of antennas that can be turned off depends on how much In some implementations, the multibeam state vector can be expressed as $$c = \sum_k a_k b_k$$

where $b_k$ is the individual beam state, k pointing at a particular direction in space and $a_k$ is a unit magnitude complex number that is added to reduce (e.g., minimize) the dynamic range of the resulting beam coefficient. In some implementations, the phased antenna array can shut down the power amplifier on a per slot basis. In some implementations, beam switching can be within the 1 microsecond IFS window specified in 802.11 ad.

In some implementations, the array beam width (3 dB) can be a function of the number of elements in one dimension as $$\theta_{3dB} = \frac{102}{\sqrt{N}}$$

where N is the number of elements in the PAA. As an illustrative example, the table below shows the 3 dB beamwidth and the loss in EIRP as a function of number of elements.

| | N | | | | | | | | | | | |
|---|---|---|---|---|---|---|---|---|---|---|---|---|
| | 25 | 36 | 49 | 64 | 81 | 100 | 121 | 144 | 169 | 196 | 225 | 256 |
| theta_3dB (degrees) | 20.4 | 17.0 | 14.6 | 12.8 | 11.3 | 10.2 | 9.3 | 8.5 | 7.8 | 7.3 | 6.8 | 6.4 |
| EIRP loss (dB) | 20.2 | 17.0 | 14.4 | 12.0 | 10.0 | −8.2 | −6.5 | −5.0 | −3.6 | −2.3 | 1.1 | 0.0 |

In some implementations, the self-interference and inter sector interference is sufficiently small such that the highest MCS shows almost no interference. For example, the source of self-interference can be Carrier Frequency Offset (CFO), Sampling Frequency Offset (SFO), Symbol timing offset (STO), I/Q imbalance, amplitude and GD non-flatness, and phase noise.

In some implementations, the carrier frequency offset (CFO) and symbol timing offset (STO) are estimated in two phases, a coarse phase and a fine phase. The coarse CFO and STO can be estimated based on the STF. The fine (or, "residual") CFO and STO can be obtained from the CEF. Channel estimation is also performed based on the CEF. Timing can be estimated based on the strongest tap in the impulse response derived from the CEF.

The CFO is estimated by computing the inner product of the GI sequence with an earlier transmission of the same sequence. The CFO ($f_{CFO}$) can manifest as a phase ramp in time (ignoring second order effects) and can be expressed as:

$$a(n) = x(n)x^*(n-N) = e^{j2\pi f_{CFO}NT_s}$$

In the above equation, N represents the delay, x(n) represents a GI sequence, x(n−N) represents an earlier transmission of the same sequence, a(n) represents the inner product, and the ideal sampling period is denoted $T_s$. Thus, the CFO ($f_{CFO}$) can be estimated as $$\hat{f}_{CFO} = \frac{<a}{2\pi NT_s}$$

The modem can digitally correct for the CFO by applying the following correction: $e^{-j2\pi f_{CFO}NT_s}$. In some implementations, if the same crystal (or clock source) is used to derive both the carrier frequency and the sampling clock, the crystal ppm can be estimated as $\hat{\varepsilon} = \hat{f}_{CFO}/f_c$ and is used to derive the sampling error. However, if the center frequency is assumed to be inflexible, then the sampling correction may be incorrect. If the center frequency is flexible, in some implementations, the SFO can be estimated using Gardner/Mueller algorithms.

In some implementations, modem synchronization can be performed to reduce cross sector detection and increase efficiency. For modem synchronization, a 1 pps signal included in the GNSS information can be available at both the aerial station and a ground station.

In some implementations, the equalizer (e.g., a frequency domain MMSE equalizer) on the modem can compensate for benign delay spreads. Large delay spreads may cause spectral nulls which cannot be compensated by the equalizer without significantly affecting the noise performance. For example, this can be the case when the multipath powers are comparable to that of the main path power. Delay spread can be due to: non-flat spectral response of radio frequency (RF)/intermediate frequency (IF)/base band (BB) filters, path delay on the phased array, or CPE antenna path delays.

In some implementations, a ground station's 3 dB beam width can be expressed as $$\theta_{3dB} = 70\frac{\lambda}{D}$$

The reflector antenna on the ground station side can have a narrow beam width. In some implementations, the beam width can be fixed.

In some implementations, pointing and tracking an aerial station by a ground station can be based on the ground station having access to location information of the aerial station. For example, the location information of the aerial station can be pre-stored in the memory at the ground station and retrieved from the memory via a TT&C radio link. In some implementations, the ground station is aware of its own location. Based on the location of the aerial station and its own location, the ground station can compute one or more parameters for pointing to the aerial station. In some implementations, a ground station can continuously track an aerial station that is located in the field of view of the ground station. The field of view information can be pre-stored at the ground station. For example, continuous tracking prevents or reduces signal loss (between the ground station and the aerial station) and outage associated with loss of signal. The ground station can be configured to operate in appropriate degrees of freedom (DoF) for continuously tracking a flight path of the aerial station. For example, the tracking can be +/−70 degrees on both axes.

To provide greater throughputs, an aerial station can include multiple access points (APs) that service different sectors of a geographical area. In conventional techniques, the timing of the multiple access points located on an aerial station are not synchronized. That is, the data (e.g., packets) provided by the APs are not transmitted at the same or similar time such that the packets are received by the ground stations at different times. This leads to cross-detection (e.g., when one ground station receives and initially analyzes a packet intended for another ground station before discarding it) and hence loss in throughput. In some implementations, cross-detection can be avoided by synchronizing the clocks of multiple access points located on an aerial station. The synchronization facilitates transmissions from every transmitter to arrive simultaneously (or closely in time) at the receiver. Thus, packet transmissions in the system can be synchronized over a TDMA time slot.

In some implementations, the aerial station can synchronize the clocks of multiple APs, as discussed above, for example, by using a GPS signal as a clock. This can cause the APs to transmit their corresponding packets at the same or similar time. For example, if a first ground station receives an interferer packet intended to be received by another ground station before the first ground station receives its intended packet, then this can result in the loss of throughput because the first ground station would latch upon the interferer packet before the intended packet. Reducing the early arrival time of the interferer packet (in relation to when the intended packet is received) such that the interferer packet and the intended packet are received at the same or similar time can result in the first ground station latching upon the intended packet instead. This can be performed because the ground stations can be configured to latch upon the stronger signal. The intended signal can be the stronger signal (e.g., have a higher signal strength or power) in comparison with the interferer signal when received by the first ground station, and the interferer signal can be the stronger signal in comparison with the intended signal when received by the second ground station. That is, the desired signal providing the intended packet to the corresponding ground station would be higher in power due to the antennas selected to transmit the signals by the aerial station. Thus, if the signals providing the packets are received by the ground stations at the same or similar time, then the ground stations can latch upon the signal with the highest power and process those packets instead of interfering packets, avoiding cross detection and, therefore, improving throughput.

In some implementations, cross-detection can be further avoided by applying a frequency offset that is sufficient to de-sensitize the receive correlators. For example, the frequency offsets can be expressed as $$\Delta f = \frac{k f_s}{128} \; k = \ldots, -2, -1, 0, 1, 2, \ldots$$

where $f_s$ is the sampling frequency. Thus, applying a frequency offset to each of the APs can further reduce cross detection. In some implementations, this can result in the APs transmitting at slightly different frequencies based on the offsets applied.

In some implementations, cross-detection can also be avoided by limiting the AGC gains. In some implementations, the AGC loop operates in a manner similar to a 802.11ad system, for example, providing a feedback system to regulate the received signal strength at the CPE to ensure that the signal-to-noise ratio (SNR) of the signal received from the aerial station is at a level to allow for decoding or other processing. The AGC loop is reset to maximum gain during IFS (e.g., end of packet) and when a new packet arrives, iteratively measures during the STF portion of the packet, and lowers AGC gain progressively such that the dynamic range of the ADC is properly utilized. In some implementations of the disclosed system, the AGC can span 30 dB.

Figure 8A:
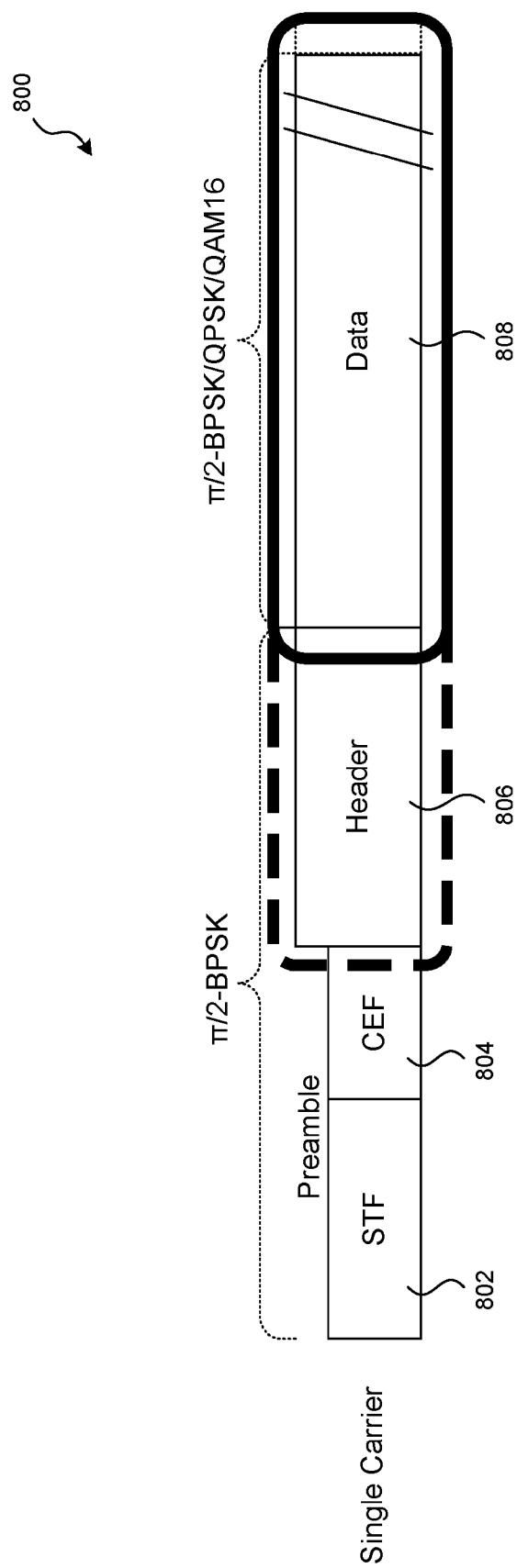
FIG. 8A shows an example of a SC-PHY packet.

FIG. 8A shows an example of a SC-PHY packet 800. For example, the packet 800 can be based on a single carrier transmission. The packet 800 includes a short training field (STF) 802, a channel estimation field (CEF) 804, a header 806, and data 808. FIG. 8A also shows various example modulation schemes for transmitting different portions of the packet 800. In some implementations, the STF can be used to set the automatic gain control (AGC) loop.

Figure 8B:
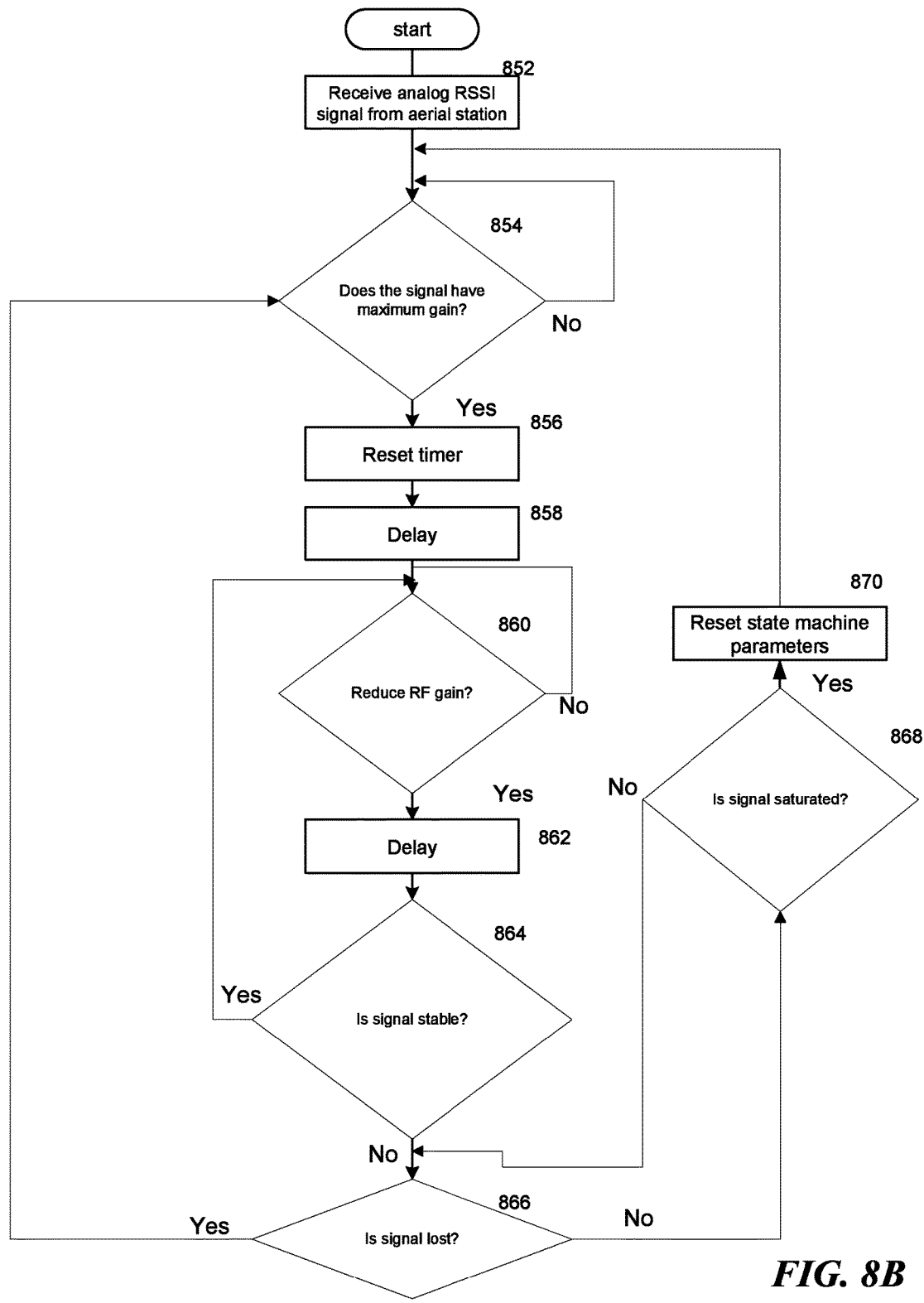
FIG. 8B shows an example process of avoiding cross-detection.

FIG. 8B shows an example process 850 for resetting the AGC state machine parameters. The state machine parameters of the AGC is changed so that whenever a stronger signal arrives at the modem, the state machine resets to receive the stronger signal. This helps in detetcting the desired signal correctly as long as the desired signal is X dB stronger than the interfering signal, where X depends on the highest modulation and coding format. At block 852, the AGC receives an analog received signal strength indicator (RSSI) signal from an aerial station. At block 854, the AGC determines if the RSSI signal has maximum gain. If the RSSI signal does not have maximum gain, then the process loops back to block 854. If the RSSI signal has maximum gain, then at block 856, the timer is reset. The process then enters a delay block 858. At block 860, the process determines if the RF gain has to be reduced. For example, the RF gain can be reduced if the signal has a strong signal strength. That is, if the signal is weak, the a high (e.g., maximum) gain is applied to amplify the weak signal. By contrast, if the signal is strong, then the gain can be reduced. If the process determines that the RF gain is not to be reduced, then the process loops back to block 860. If the process determines that the RF gain is to be reduced, then it enters delay block 862 where operation is paused for a short time (e.g., 0.2 microseconds). At block 864, the process determines if the signal is stable following the delay. If the signal is stable, the process loops back to block 860. If the process determines that the signal is not stable, then it determines (at block 866) if the signal is lost. If the process determines that the signal is lost, then the process loops back to block 854. If the process determines that the signal is not lost (e.g., the signal is still being received by the ground station), then the process determines (at block 858) if the signal is saturated (e.g., due to the increase in gain corresponding to the weak signal strength). If the process determines that the signal is not saturated, then it loops back to block 866. If the process determines that the signal is saturated, then the process resets (at block 870) the state machine parameters of the AGC and loops back to block 854. By resetting the AGC upon the determination that the signal is saturated, this allows for the AGC to latch upon the intended signal providing an intended packet if it is provided after receiving an interfering signal providing an intended packet for another ground station.

In some implementations, the AGC loop can converge within the STF duration (e.g., 1.236 microseconds at a symbol rate of 1.76 G Symbols per second) with sufficient margin so as to make timing and frequency offset measurements before the end of STF. In some implementations, a modem can perform 3 AGC iterations (each iteration is one measurement plus one correction) before starting frequency and time offset measurements on the STF.

In some implementations, a programmable gain look up table (LUT) is available to calibrate to the steps of the variable gain amplifier (VGA) gain on the RF side. The measurement time and hold-off time can be adjustable so that it can be calibrated to the delay on the digital interface and the RF side.

Figure 9:
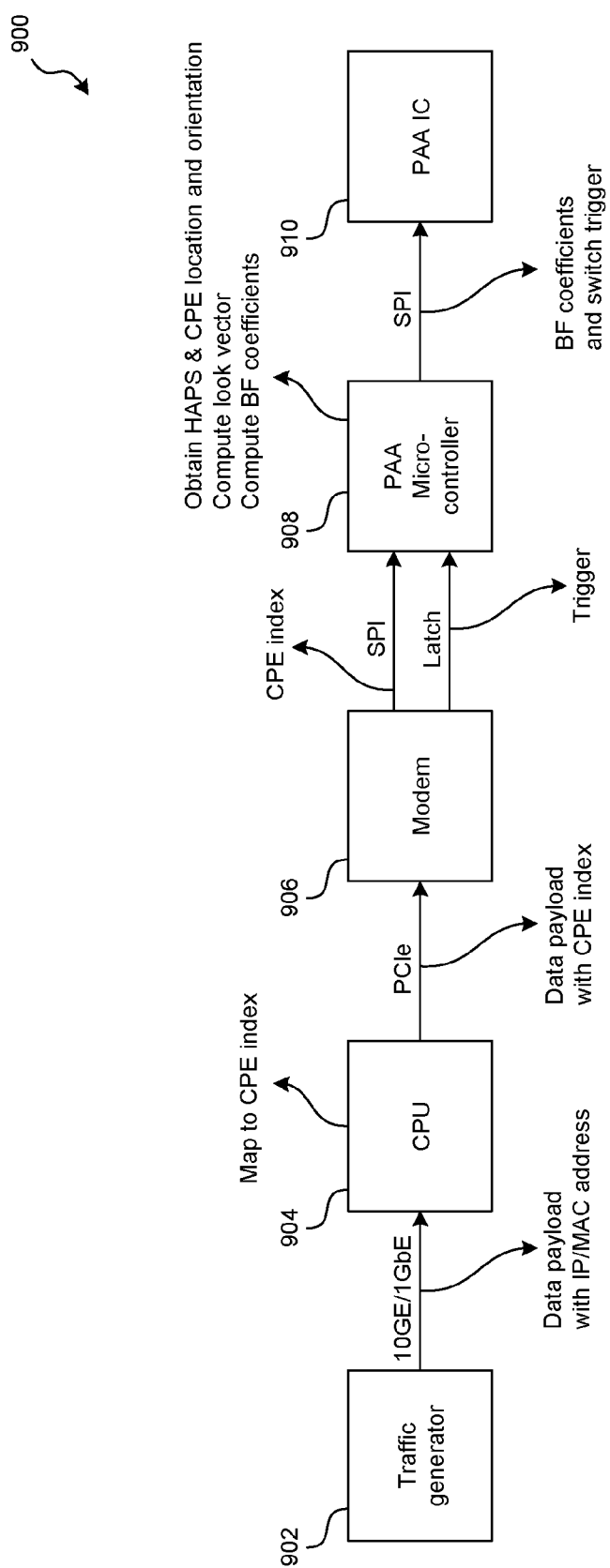
FIG. 9 shows a block diagram of an embodiment of communicating beam information for both uplink and downlink transmissions.

FIG. 9 shows a block diagram 900 of an embodiment of communicating beam information for both uplink and downlink transmissions. The beam information can be used to point or direct the beam in sync with the packet being transmitted/received. The beam information can include a sync signal provided by a pulse on a general purpose input output (GPIO) line into a PAA module that includes a microcontroller and an integrated circuit. Traffic generator 902 communicates (via a 10 G or a 1 Gb Ethernet connection) data payload with an IP or a MAC address of the ground station to CPU 904. CPU 904 communicates the data payload and the index identifying the ground station via a PCI express bus to modem 906. The CPU 904 maps to an index identifying a ground station. The modem 906 communicates with the PAA microcontroller 908 via a Serial Peripheral Interface (SPI) for sending the index identifying the ground station and a latch for sending the switch trigger. The PAA microcontroller 908 obtains location and orientation of the aerial station and the ground station. The PAA microcontroller 908 computes the look vector and the beamforming coefficients. The PAA microcontroller 908 sends the beamforming coefficients and the switch trigger to the PAA integrated circuit (IC) 910. In some embodiments, the index identifying the ground station can be a number.

Figure 10:
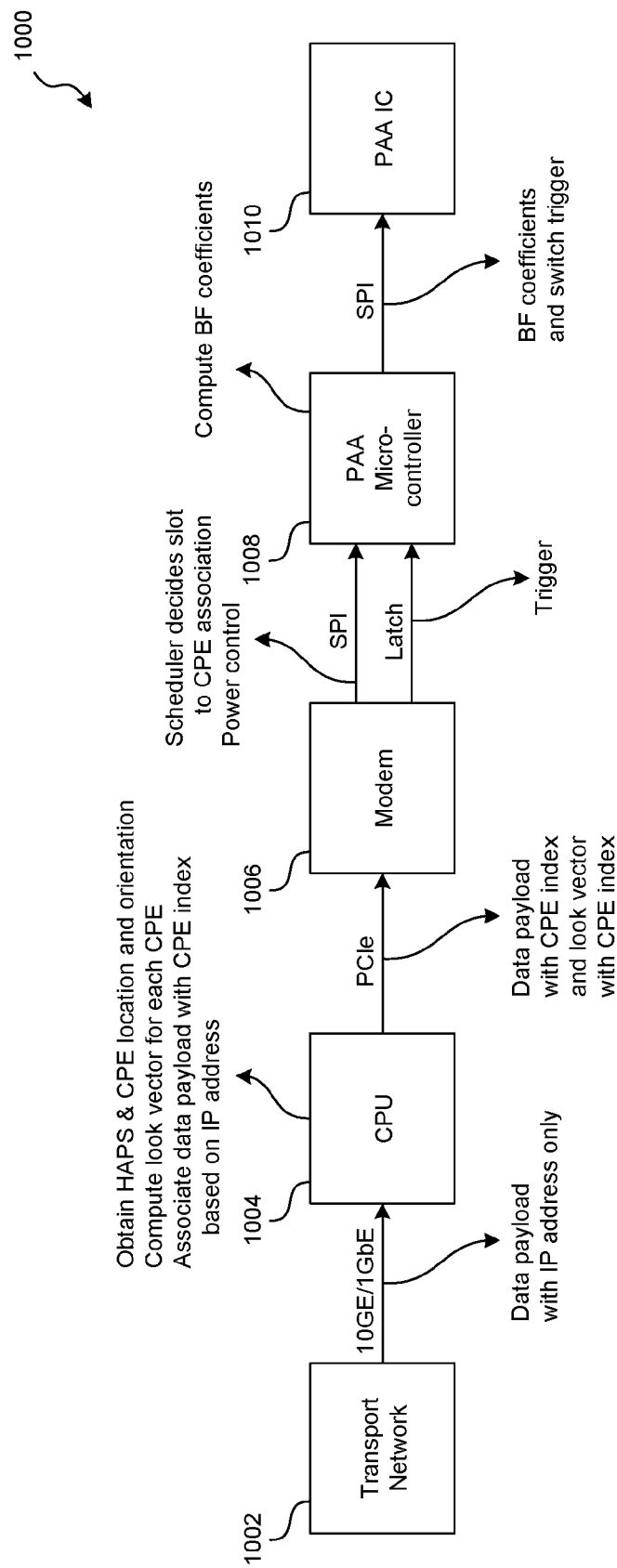
FIG. 10 shows a block diagram of an embodiment of communicating beam information for downlink transmissions.

FIG. 10 shows a block diagram 1000 of an embodiment of communicating beam information for downlink transmissions. In some implementations, during a downlink transmission, an aerial station communicates data to a ground station over a TDMA time slot. Transport network 1002 (e.g., a mesh of cross-links formed between two or more aerial stations, as previously discussed) communicates data payload and an IP address or other identifier of the ground station to CPU 1004 via a 10 G or a 1 G Ethernet connection. The CPU 1004 obtains location and orientation of the aerial station and each ground station that the aerial station is communicating with. The CPU 1004 computes a look vector for the ground station, and associates a data payload with an index identifying the ground station based on an IP address. The CPU 1004 communicates data payload, a look vector, and an index identifying the ground station to modem 1006. In some implementations, the data payload and the look vector are communicated separately and the index identifying the ground station is included in the data payload and the look vector. The modem 1006 includes a scheduler that determines the association between a ground station and a TDMA time slot. For example, given a TDMA time slot, this can include determining which ground station is to be selected for data transmission. In some implementations, the scheduler at the aerial station schedules a transmission to a ground station, at least 2-3 TDMA slots prior to actual transmission slot. In some implementations, determining the association between a ground station and a time slot also includes power control based on the distance between the aerial station and a ground station. The modem 1006 communicates with the PAA microcontroller 1008 via a SPI interface for sending the look vector and a PAA scalar magnitude. The modem 1006 communicates the switch trigger via a latch. The PAA microcontroller 1008 computes the beamforming coefficients. The PAA microcontroller 1008 sends the beamforming coefficients and the switch trigger to the PAA integrated circuit (IC) 1010 via a SPI interface.

Figure 11:
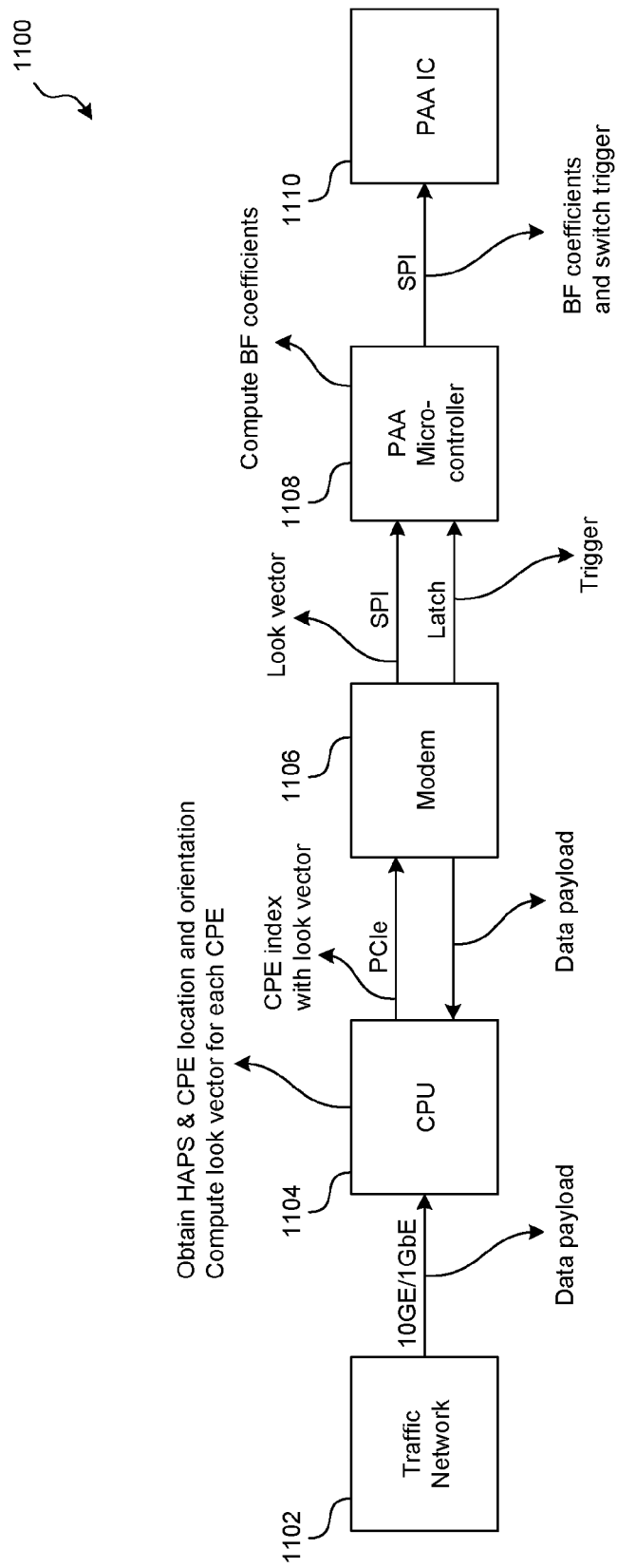
FIG. 11 shows a block diagram of an embodiment of communicating beam information for uplink transmissions.

FIG. 11 shows a block diagram 1100 of an embodiment of communicating beam information for uplink transmissions. In some implementations, during an uplink transmission, a ground station communicates data to an aerial station over a TDMA time slot. Transport network 1102 (e.g., a mesh of cross-links formed between two or more aerial stations) communicates data payload of the ground station to CPU 1104 via a 10 G or a 1 G Ethernet connection. The CPU 1104 obtains location and orientation of the aerial station and each ground station that the aerial station is communicating with. The CPU 1104 computes a look vector for the ground station. The CPU 1104 communicates a look vector and an index identifying the ground station to modem 1106 via a PCI express connection. The modem 1106 communicates the data payload to the CPU 1104. The modem 1006 includes a scheduler that determines the association between a ground station and a TDMA time slot. For example, given a TDMA time slot, the scheduler determines which ground station to send the data. The modem 1106 communicates with the PAA microcontroller 1108 via a SPI interface for sending the look vector and a switch trigger via a latch. The PAA microcontroller 1108 sends the beamforming coefficients and the switch trigger to the PAA integrated circuit (IC) 1110 via a SPI interface.

In some implementations, the scheduler at an aerial station allocates slots to ground stations based on a QoS metric computed from a Qos field in a data/control packet. The QoS field can be based on the ARQ policy, the number of retries, latency and PER target. The QoS metric can be a function of the instantaneous throughput, a weighted value of past throughputs, and a cost. The packet with the highest QoS metric is transmitted. For example, system commands can have the highest priority followed by voice/data traffic.

Figure 12:
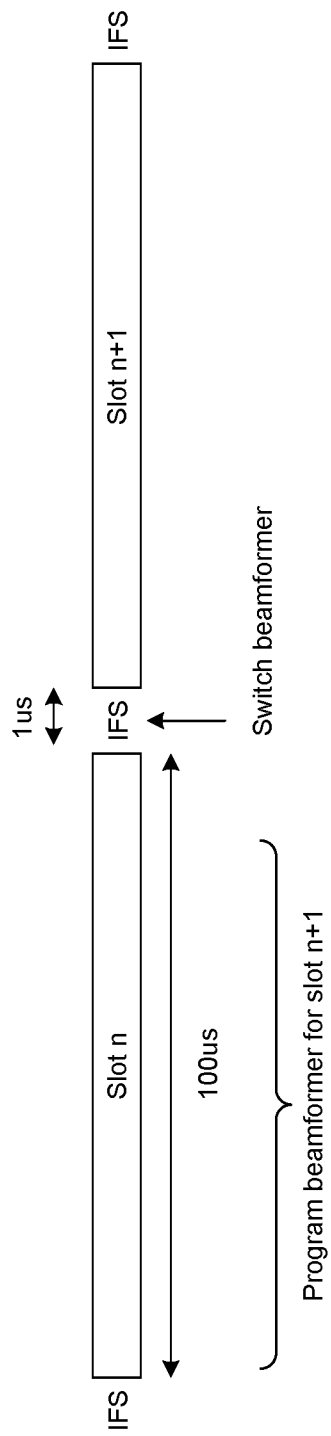
FIG. 12 shows an example timing diagram for programming a beamformer.

FIG. 12 shows an example timing diagram 1200 for programming a beamformer. In some implementations, the beamformer programming starts 100 microseconds before the beamformer is used and the beam of the beamformer is switched within the IFS duration. Switching the beamformer can occur in sync with the transmission of the packet. In some implementations, four SPIs are used by the microcontroller to program the PAA ICs. PAA ICs are grouped into 4 sets, and the PAA ICs within the same set are connected together in a daisy chain fashion. The time taken to program one set of coefficients to the entire array is estimated to be around 50 us. These coefficients (or beamforming coefficients) can be used to position the beams, for example, by providing adjustments to phase, amplitude, or other characteristics of the signals corresponding to the beams.

The beamformer coefficients can be programmed into the PAA IC within 100 us. Programming the beamformer includes writing of the look vector (LV) into the microcontroller, translating the LV into beamforming coefficients, programming the coefficients into the PAA IC, and switching to (or activating) the newly programmed coefficients. In some implementations, the computation of the beamformer coefficients can occur in parallel with the programming of the beamformer coefficients in a pipelined fashion. For example, programming the beamformer coefficients can use Direct Memory Access (DMA) transfer mechanism to free up CPU time needed to compute the beamformer coefficients. In some embodiments, upon detecting a bias in the computation of the beamforming coefficients, or generally, in the computation of the attitude information of the aerial station, the aerial station can perform a closed loop control correction based on the signal power received from the ground stations. In some implementations, the modem at the aerial station dithers the beam in eight (8) directions from its current location. If the modem observes a stronger signal in one of the directions, then the current (or locked) location is changed to the location of the stronger signal.

Figure 13:
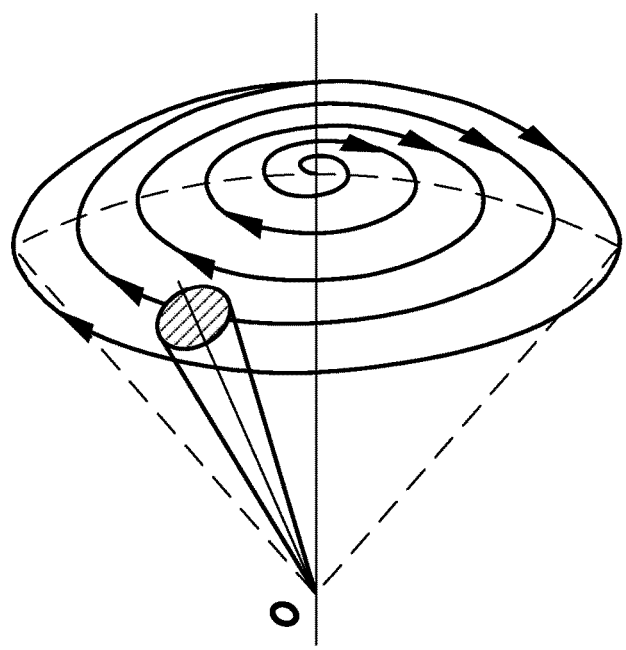
FIG. 13 shows an example signal acquisition process at a ground station.

FIG. 13 shows an example signal acquisition process 1300 at a ground station. During discovery of ground stations by the aerial station, the aerial station can steer a beam to scan each spot on the footprint as the locations of the ground stations are initially unknown. That is, the aerial station can move the beam from location-to-location to scan the spots. Additionally, the ground stations can have reflector antennas with very narrow beam width. However, steering of the beam by the aerial station and/or the narrow beam width of reflector antennas greatly increases the time required to acquire a signal from an aerial station. Further, in some scenarios, the ground station and the aerial station can fail to point to each other simultaneously at any point during the acquisition phase, leading to a failed acquisition.

The signal acquisition process can begin when the aerial stations transmits a beacon. The beacon can indicate information regarding the beam, for example, its polarization, frequency offsets, timing information, or any of the other characteristics described herein. A ground station that has not registered with the aerial station listens for a beacon transmission on a continuous basis (e.g., determines whether a beacon has been transmitted by an aerial station), even though its clock may not be necessarily aligned with the clock of the aerial station. A ground station can use a beacon transmission from an aerial station to identify a RACH opportunity and also to align its clock with the clock of the aerial station.

Upon detecting a packet, a ground station can estimate the SNR, a type of the packet, and a destination address of the packet. A packet can be a beacon packet (e.g., beacon transmissions that are broadcast to one or more ground stations). Alternatively, a packet can be a data packet directed to a ground station.

In some implementations, a ground station supports dual polarization (not necessarily simultaneous polarization and can switch between the two polarization states (e.g., Right Hand Circular Polarization and Left Hand Circular Polarization) within a span of 1 slot. In some implementations, the acquisition process scans +/−70 degrees (in both dimensions) and for both polarization states. For example, a ground station can start by pointing at the horizon (e.g., idle position) and spirally scan to the zenith using a single polarization during the scan, i.e., the scanning is performed once per polarization. Upon reaching the zenith, the ground station switches polarization and scan spirally outwards back to the horizon position as shown in FIG. 13. As an outcome of the acquisition process, in some implementations, a ground station can identify one or more scan angle parameters (e.g., azimuth and elevation) and a polarization state that produced the strongest signal. Further, the ground station can also align its timing with the timing of the aerial station. In some implementations, the scanning by the ground station is smooth so that packets do not get distorted in spite that the scan (by the ground station) is not synchronous to the packet transmission (by the aerial station).

To reduce wear on the ground station's gear and motor mechanism, when a valid signal from an aerial station is not detected by a ground station during an initial scan, the ground station returns and remains in the idle position (e.g., with zero Elevation and zero Azimuth angles) for a wait interval before re-initiating a new scan. In some implementations, the wait interval can progressively increase (e.g., up to a maximum value) as the detection repeatedly fails.

In some implementations, an aerial station can also scan for transmissions from a base station. The scanning at the aerial station, e.g., by a PAA at the aerial station can be non-continuous. Because the RX phased array on the aerial station doesn't necessarily move its beam in a continuous fashion, and the transmission from the ground station is not yet fully synchronous (i.e., RTT not known yet), the packets can get chopped off at the RX of the aerial station. Thus, in some implementations, each packet in the sequence of packets is less than half the duration of the beam switching time, so that at least some of the packets get detected by the aerial station.

Figure 14:
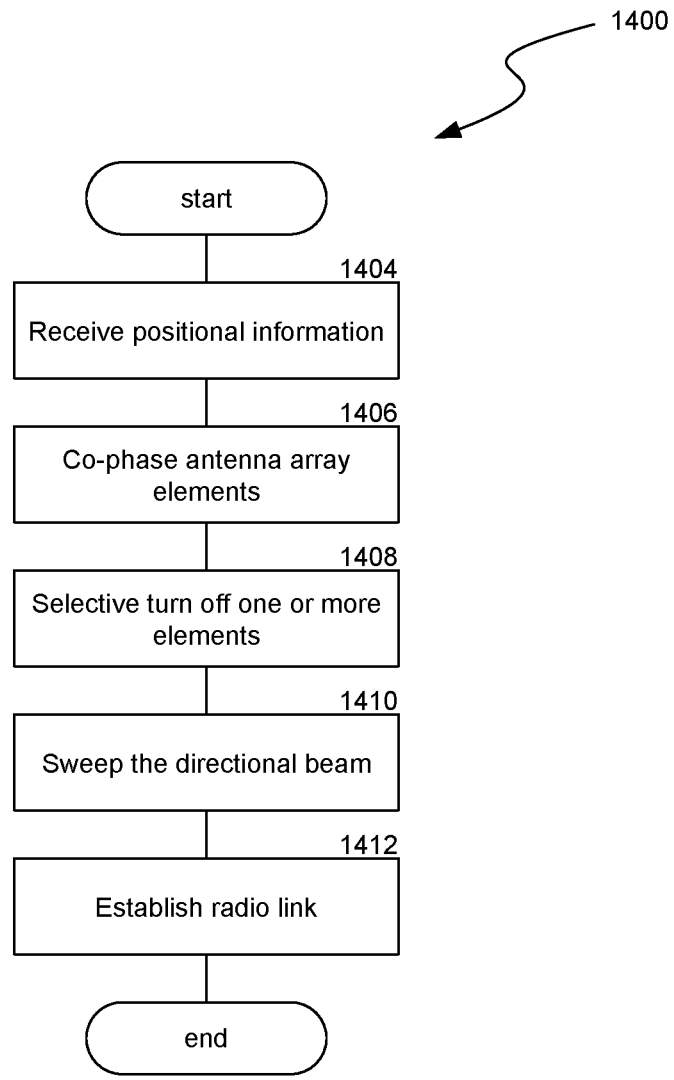
FIG. 14 shows an example process for establishing a RF link between an aerial station and one or more ground stations.

FIG. 14 shows an example process 1400 for establishing a RF link between an aerial station and one or more ground stations. At block 1404, the process receives positional information of a ground station with respect to a terrestrial reference frame. For example, the positional information regarding a location of a ground station in relation to a particular point on the ground can be received. At block 1406, the process co-phases elements of a phased antenna array for generating a directional beam. For example, each of the elements of the phased antenna array can transmit a signal at a different phase, each of the phases offset by a threshold phase delay with respect to another element. In one example, one element can be offset by T1, a second element can be offset by T2 (where T2 is twice as much as T1), a third element can be offset by T3 (where T3 is three times as much as T1), and so forth resulting in each signal provided by the corresponding element to be incremented by T1. In some implementations, the beam (also referred to herein as a beacon) is based on the positional information of a ground station. For example, the directional beam can be a contoured beam that compensates for link degradation due to long transmission ranges. The beam can be directed at a sector of a geographical area where multiple ground stations are deployed. In some implementations, the beam provides uniform power flux density throughout the sector. This results in a simplified scanning by the ground stations for locking with an aerial station in a short time. At block 1408, the process selectively turns off one or more antenna elements on the phased antenna array. As previously discussed, turning off additional antenna elements can result in a larger beam, however can also lead to a reduction in total transmitted power and, therefore, a reduction in power of the signals received at the ground stations. At block 1410, the process sweeps the beam to cover a geographical area, e.g., a sector. For example, the beam can be moved from location-to-location throughout the geographical area. In some implementations, as the beam covers the geographical area by sweeping through it, additional antenna elements can be turned off. Thus, the beam can be widened but the number of additional antenna elements to be turned off can be halted when the transmitted power results in too much of a reduction of power of the signals received at the ground stations. For example, the ground stations can provide an acknowledgement of the transmitted signals to indicate that the total transmitted power is acceptable and therefore the larger beam is acceptable. When the beam gets too large in size, the ground stations might not provide an acknowledge to indicate that the total transmitted power has reduced too much and, therefore, additional antenna elements can be turned on that were previously turned off. Thus, communications can be established with the ground stations when the beam is large enough in beam width to cover all of the ground stations in the geographical area, but also strong enough in transmit power to provide a usable signal at each of those ground stations in the geographical area. That is, when all of the ground stations provide back at acknowledgement while antenna elements are being turned off, the beam width and transmit power are acceptable or sufficient to provide communications between the aerial station and the ground stations. When some ground stations fail to provide back an acknowledgement, then antenna elements can be switched back on. At block 1412 the process transmits a power adjustment (e.g., power up/down) command to the ground station. In some implementations, an aerial station also provides timing correction information to a ground station in the initial beacon transmission. The timing correction information, for example, can be based on a packet arrival time with respect to a nominal time at the Rx of the aerial station. Upon receiving the power adjustment command, a ground station adjusts its transmission power to perform uplink power control. As an outcome of this process, a radio link is established between an aerial station and a ground station.

In some implementations, the beam informs the ground station of a RACH opportunity during which the ground station transmits a sequence of packets of equal length to the aerial station. The RACH opportunity is used by the ground station to send information to the aerial station to indicate the presence of the ground station and request admission into the network. Because the aerial station searches for packets in a non-continuous matter, sending a sequence of packets increases the probability of the aerial station to receive at least a few of the transmitted sequence packets. In some implementations, the packets include a sequence number/index which indicates a packet's position in the sequence of packets. This allows the UAV to correctly identify the transmission start of the packet train.

To reduce the acquisition time, the RACH packet starts off with transmitting the highest power it can possibly put out. Note that this is different from the traditional approach, where the RACH power slowly ramps up from slot to slot.

In some implementations, due to the motion of the aerial station or movement of the aerial station antenna, a ground station is to be handed over from one sector to another. The handover procedure can be based, for example, on the orientation of the aerial station with respect to a ground station. The handover procedure at the aerial station is started when the ground station location approaches the boundary between the source sector and target sector. In some implementations, the aerial station can setup a downlink SNR/SINR measurement channel on the target sector, in addition to an on-going SNR/SINR measurement channel on the source sector. For example, a ground station located can measure and feedback the downlink SNR/SINR measurements to the aerial station on the downlink SNR/SINR measurement channel. In some implementations, when the SNR/SINR on the target sector exceeds the SNR/SINR at the source sector by a hysteresis margin, the aerial station triggers the actual handover. At the aerial station, contexts and buffers associated with the hardware can get transferred from the source sector to the target sector during the handover, and a message can be sent to the ground station to finish the handover procedure. In this message, the new schedules, the new polarization state(s), the new communication frequencies, and SNR/SINR measurements corresponding to the target sector can be sent from the aerial station to the ground station.

In some implementations, a temporary roll/pitch motion of the aerial station does not trigger a handover procedure. In some implementations, inter-aerial station handovers can occur. For example, in scenarios when one aerial station is being replaced with another aerial station.

In some embodiments, power control is performed at the ground station as well as at the aerial station. The ground stations, being at various distances away from the aerial stations, can perceive different path losses (near-far problem). In addition the fades arising due to weather such as rain/cloud fades may not be fully correlated within the geographical area covered by the aerial station. This can lead to significant dynamic range in received power at the aerial station if there were no control of power at the ground station, e.g., if every ground station was transmitting at constant TX power. Ground stations associated with the same sector as the access point (AP) at the aerial station do not cause interference to each other because the multiplexing is fully orthogonal (TDMA). On the other hand, those ground stations transmitting to APs servicing different sectors can affect the RX signal quality at the aerial station. (In some embodiments, an aerial station can include 4 APs servicing four sectors or 8 APs servicing 8 sectors.) A first ground station and the second ground station can be located in different sectors and can transmit to two APs located on the aerial station. Thus, by reducing the TX power, a first ground station can reduce the interference caused to a transmission from a second ground station to the aerial station. In some embodiments, the commands for performing uplink power control are provided by the aerial station to the ground station in the form of MAC level messages (e.g., via a Power control message). The aerial station can be informed of the margin to full power (e.g., via a Power margin message), and the aerial station can provide a power up/down command based on its own measurement of SINR. For example, if the SINR of an uplink signal from a ground station exceeds the SNR associated with the highest modulation and coding format, the aerial station can send a power down command to the respective ground station that sent the uplink signal. The mathematical analysis for downlink and uplink power control is provided below.

Downlink Power Control

Assume that two sectors ($S_1$ and $S_2$) are transmitting simultaneously each to its own CPE; CPE1 and CPE2. Let the transmitted power on the sectors would be denoted by $P_{TX,1}$ and $P_{TX,2}$. The power received on the ground by CPE1 is given by $$P_{RX,1} = F_1 G_1(\theta_1 \theta_{tilt}, \theta_1 + \theta_{tilt}) P_{TX,1} + F_1 G_2(\theta_1 - \theta_{tilt}, \theta_2 - \theta_{tilt}) P_{TX,2}$$

The power received on the ground by CPE2 is given by $$P_{RX,2} = F_2 G_1(\theta_2 \theta_{tilt}, \theta_1 + \theta_{tilt}) P_{TX,1} + F_2 G_2(\theta_2 - \theta_{tilt}, \theta_2 - \theta_{tilt}) P_{TX,2}$$

In the above equations, F1 and F2 represent the fading variables G2 (θ1,2) is the gain on the second sector when the beam is pointed at θ2 and the observing CPE is located at θ1. G2 (θ1,2) is the maximum gain that a CPE located at θ2 can achieve i.e. when the beam is pointing in the direction of the CPE. $G_{ANT}(\theta_1-\theta_2)=G_2(\theta_1, \theta_2)/G_2(\theta_2, \theta_2)$. In some implementations it can be assumed that the antenna array is tilted from facing straight down by an angle $\theta_{tilt}=45°$ The SINR is therefore given as $$\gamma_{RX,1} = \frac{F_1 G_1(\theta_1 + \theta_{tilt}, \theta_1 + \theta_{tilt}) P_{TX,1}}{F_1 G_2(\theta_1 - \theta_{tilt}, \theta_2 - \theta_{tilt}) P_{TX,2} + P_{noise}}$$

Ignoring thermal noise, the SINR can be represented as $$\gamma_{RX,1} = \frac{G_1(\theta_1 + \theta_{tilt}, \theta_1 + \theta_{tilt}) P_{TX,1}}{G_2(\theta_1 - \theta_{tilt}, \theta_2 - \theta_{tilt}) P_{TX,2}} = \frac{\Delta P}{G_{Ant}(\theta_2 - \theta_1)}$$

where the power difference (in logarithmic scale) ΔP is the ratio $P_{TX,1}/P_{TX,2}$.

The SNR achieved should be large enough to meet the highest MCS, denoted by $\gamma_{max}$.

$$\gamma_{RX,1} = \frac{\Delta P}{G_{Ant}(\theta)} \geq \gamma_{max}$$

$$\gamma_{RX,2} = \frac{1/\Delta P}{G_{Ant}(\theta)} \geq \gamma_{max}$$

The bound on the side lobe level is then given as $$G_{Ant}(\theta) \leq \frac{\min(\Delta P, 1/\Delta P)}{\gamma_{max}}$$

That is, there is a minimum angular separation $\theta_{min}$, between the beams. In some implementations, a scheduler at an aerial station can simultaneously transmit beams to 2 sectors such that the beams are separated at least by $\theta_{min}$. Applying power control to any of the beams can improve one link while degrading the other. In other words, according to disclosed embodiments, for 2 beams that are separated by the minimum angular separation, i.e., $|\theta_2-\theta_1|=\theta_{min}$, if the SINR of an uplink signal from a ground station exceeds the SNR associated with the highest modulation and coding format, the aerial station can send a power down command to the respective ground station that sent the uplink signal. However, if the two beams are sufficiently apart, i.e., $|\theta_2-\theta_1|\gg\theta_{min}$, power control (e.g., proportional to the beamforming angle) can be applied without affecting each other's SINR performance at the aerial station.

$$\theta_2 - \theta_1 \geq G_{Ant}^{-1}\left(\frac{\min(\Delta P, 1/\Delta P)}{\gamma_{max}}\right) = \theta_{min}$$

Thus, the above equation shows that the greatest interference to sector 1 is when sector 2 scans to its nadir position, assuming that one antenna array will not scan into the area of another, i.e. $\theta_2 \geq 0$ and $\theta_1 \leq 0$. For implementations in which the beams are independently scheduled, then the greatest interference is likely to occur. For implementations, in which the beams are jointly scheduled, the interference to sector 1 is less than a value of the greatest interference. Thus embodiments of the present disclosure allow for both joint as well as independent scheduling of the beams. For joint scheduling, simultaneous transmissions to users that are closely spaced are avoided in order to improve the perceived SINR at the ground stations.

The above equation also show that for higher values of the power difference $\Delta P$, the beamforming angle can be larger thereby pointing into the interior of a sector away from the nadir. Conversely, CPEs that are located in the interior of a sector generally have greater ability to adjust/increase their power without worsening the SINR performance at other sectors. Nominally, when there is no power difference, the angle is given as $$\theta_1 \leq -G_{Ant}^{-1}\left(\frac{1}{\gamma_{max}}\right)$$

For the uplink power control, a similar analysis as shown above for downlink power control can be shown to yield similar results.

In some embodiments, downlink transmission timing on the aerial station is autonomous but based on GNSS pps. In some implementations, all sectors are driven by the same source clock. The packet transmission can be in sync with the GNSS pps. The ground station receives the downlink transmission like a normal WiGiG receiver. In some implementations, the downlink transmission is asynchronous.

The uplink and downlink slot counter can be synchronous, the scheduler can the synchronous mode of operation to schedule the UL slot relative to the DL slot. The ground station transmission on the uplink can derive its slot time from the GNSS pps and an offset indicated by the aerial station. The slot count for UL transmission can be indicated by the scheduling message on the DL slot.

In some implementations, the Downlink transmission from sectors is in sync with each other such that their timing difference is lower than one AGC iteration on the downlink RX. The RX at the aerial station can be synchronous to the pps and the ground station TX is supposed to align with the RX slot at the aerial station. The modem can sync itself to the pps and can enable timers to trigger packet transmissions at designated slot boundaries. The ground station modem can have the ability to receive and adjust its start time based on a correction value send by the aerial station. In some implementations, GNSS based timing may not work as GNSS accuracy is around 33 ns. The ground stations may transmit with an error 66 ns with respect to another ground station.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method of communicating in a point to multipoint (PTMP) network implemented in an aerial station configured to communicate with a plurality of ground stations, comprising:
   receiving, at the aerial station, positional information of a ground station of the plurality of ground stations;
   selecting antenna elements on a phased antenna array coupled to the aerial station for generating a directional beam, wherein the directional beam is based on the positional information;
   sweeping the directional beam to cover the plurality of ground stations;
   determining that the directional beam has a beam width sufficient to cover the plurality of ground stations and a transmit power sufficient to provide signals to the plurality of ground stations based on the sweeping of the directional beam; and
   establishing a radio link between the aerial station and the ground station in the plurality of ground stations based on the determination that the directional beam has the beam width sufficient to cover the plurality of ground stations and the transmit power sufficient to provide the signals to the plurality of ground stations.

2. The method of claim 1, wherein the positional information is based on a global navigation satellite system (GNSS) or an inertial navigation system (INS).

3. The method of claim 1, further comprising:
   upon detecting a bias in the attitude information of the aerial station, implementing a closed loop control correction based on signal power received from the plurality of ground stations.

4. The method of claim 1, wherein sweeping the beam is based on a raster scan format.

5. The method of claim 1, wherein the number of antenna elements that are turned off depends on an amount of additional sensitivity provided by a modulation and coding scheme (MCS) associated with the beam.

6. The method of claim 1, wherein selecting the antenna elements includes turning off one or more antenna elements on the phased antenna array.

7. The method of claim 1, wherein the plurality of ground stations are divided into at least a first geographical sector and a second geographical sector, further comprising:
   when the beam from the aerial station is directed at the first sector and not the second sector, adjusting transmission power at the aerial station for reducing interference at ground stations located in the second sector arising from transmissions to ground stations located in the first sector.

8. The method of claim 7, wherein the aerial station sends data transmissions to one or more ground stations in the first geographical sector, wherein the data transmissions are scheduled in time slots according to a time division multiple access (TDMA) format.

9. A non-transitory computer-readable storage medium storing instructions that, when executed, cause a computer at an aerial station to communicate with a plurality of ground stations, comprising:
   receiving, at the aerial station, positional information of a ground station of the plurality of ground stations;
   selecting antenna elements on a phased antenna array coupled to the aerial station for generating a directional beam, wherein the directional beam is based on the positional information;
   sweeping the directional beam to cover the plurality of ground stations;
   determining that the directional beam has a beam width sufficient to cover the plurality of ground stations and a transmit power sufficient to provide signals to the plurality of ground stations based on the sweeping of the directional beam; and
   establishing a radio link between the aerial station and the ground station in the plurality of ground stations based on the determination that the directional beam has the beam width sufficient to cover the plurality of ground stations and the transmit power sufficient to provide the signals to the plurality of ground stations.

10. The computer-readable storage medium of claim 9, wherein the positional information is based on a global navigation satellite system (GNSS) or an inertial navigation system (INS).

11. The computer-readable storage medium of claim 9, further comprising:
    upon detecting a bias in the attitude information of the aerial station, implementing a closed loop control correction based on signal power received from the plurality of ground stations.

12. The computer-readable storage medium of claim 9, wherein sweeping the beam is based on a raster scan format.

13. The computer-readable storage medium of claim 9, wherein the number of antenna elements that are turned off depends on an amount of additional sensitivity provided by a modulation and coding scheme (MCS) associated with the beam.

14. The method of claim 9, wherein selecting the antenna elements includes turning off one or more antenna elements on the phased antenna array.

15. The computer-readable storage medium of claim 9, wherein the plurality of ground stations are divided into at least a first geographical sector and a second geographical sector, further comprising:
    when the beam from the aerial station is directed at the first sector and not the second sector, adjusting transmission power at the aerial station for reducing interference at ground stations located in the second sector arising from transmissions to ground stations located in the first sector.

16. The computer-readable storage medium of claim 15, wherein the aerial station sends data transmissions to one or more ground stations in the first geographical sector, wherein the data transmissions are scheduled in time slots according to a time division multiple access (TDMA) format.

17. A system comprising:
    an aerial station configured for:
    receiving, at the aerial station, positional information of a ground station of a plurality of ground stations;
    selecting antenna elements on a phased antenna array coupled to the aerial station for generating a directional beam, wherein the directional beam is based on the positional information;
    sweeping the directional beam to cover the plurality of ground stations;
    determining that the directional beam has a beam width sufficient to cover the plurality of ground stations and a transmit power sufficient to provide signals to the plurality of ground stations based on the sweeping of the directional beam; and
    establishing a radio link between the aerial station and the ground station in the plurality of ground stations based on the determination that the directional beam has the beam width sufficient to cover the plurality of ground stations and the transmit power sufficient to provide the signals to the plurality of ground stations.

18. The system of claim 1, wherein the power adjustment command is transmitted in response to measurement of a Signal to Interference Ratio (SINR) for a signal sent from a ground station to the aerial station, the ground station included in the plurality of ground stations.

19. The system of claim 1, wherein the adjustment command is a power-up or a power-down command.

20. The system of claim 17, wherein the geographical area is divided into at least a first geographical sector and a second geographical sector, further comprising:
  when the beam from the aerial station is directed at the first sector and not the second sector, adjusting transmission power at the aerial station for reducing interference at ground stations located in the second sector arising from transmissions to ground stations located in the first sector.

* * * * *

UNITED STATES PATENT AND TRADEMARK OFFICE
CERTIFICATE OF CORRECTION

PATENT NO. : 10,236,968 B2
APPLICATION NO. : 15/680667
DATED : March 19, 2019
INVENTOR(S) : Sam Padinjaremannil Alex Page 1 of 1

It is certified that error appears in the above-identified patent and that said Letters Patent is hereby corrected as shown below:

In the Claims

In Column 24, Line 31, Claim 14, delete "method of claim 9," and insert -- computer-readable storage medium of claim 9, --, therefor.

Signed and Sealed this
Sixteenth Day of July, 2019

Andrei Iancu
*Director of the United States Patent and Trademark Office*